US008565260B2

(12) United States Patent
Kwon et al.

(10) Patent No.: US 8,565,260 B2
(45) Date of Patent: Oct. 22, 2013

(54) METHOD AND APPARATUS FOR TRANSMITTING SYSTEM INFORMATION FROM A BASE STATION SUPPORTING AN IMPROVED SYSTEM

(75) Inventors: Yeong Hyun Kwon, Anyang-si (KR); Jae Hoon Chung, Anyang-si (KR); So Yeon Kim, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 176 days.

(21) Appl. No.: 13/264,156

(22) PCT Filed: Apr. 13, 2010

(86) PCT No.: PCT/KR2010/002260
§ 371 (c)(1),
(2), (4) Date: Oct. 12, 2011

(87) PCT Pub. No.: WO2010/120088
PCT Pub. Date: Oct. 21, 2010

(65) Prior Publication Data
US 2012/0039256 A1 Feb. 16, 2012

Related U.S. Application Data

(60) Provisional application No. 61/168,636, filed on Apr. 13, 2009.

(51) Int. Cl.
*H04J 3/00* (2006.01)
*H04L 12/28* (2006.01)
*H04W 4/00* (2009.01)

(52) U.S. Cl.
USPC .......................... 370/464; 370/330; 370/431

(58) Field of Classification Search
None
See application file for complete search history.

(56) References Cited

U.S. PATENT DOCUMENTS

| 6,498,936 | B1 * | 12/2002 | Raith ............................. 455/466 |
| 8,427,998 | B2 * | 4/2013 | Choi et al. .................... 370/314 |
| 8,432,838 | B2 * | 4/2013 | Kwak et al. ................... 370/280 |
| 2006/0227857 | A1 | 10/2006 | Gaal | |
| 2007/0086420 | A1 * | 4/2007 | Schotten et al. .............. 370/348 |
| 2008/0159186 | A1 * | 7/2008 | Steer ............................. 370/297 |
| 2009/0116430 | A1 * | 5/2009 | Bonta et al. ................... 370/329 |

(Continued)

FOREIGN PATENT DOCUMENTS

| KR | 1020090033126 | 4/2009 |
| KR | 100708204 | 2/2011 |
| WO | 2006/132506 | 12/2006 |

*Primary Examiner* — Marsha D. Banks Harold
*Assistant Examiner* — Christopher Wyllie
(74) *Attorney, Agent, or Firm* — Lee, Hong, Degerman, Kang & Waimey

(57) ABSTRACT

The present invention relates to a wireless communication system. More particularly, the present invention relates to a method for transmitting system information in which a base station that supports a legacy system and an improved-functions legacy system having one or more functions added thereto, transmits system information, wherein said system information transmitting method comprises a step of transmitting a broadcast channel, containing system information for supporting user equipment for the legacy system, in a predetermined number of symbols which follow the synchronous channel in a first subframe of a wireless frame containing a plurality of subframes; and a step of transmitting additional system information for supporting user equipment for the improved system in a second subframe, excluding the first subframe, from among the plurality of subframes. The present invention also relates to a base station which implements said method for transmitting system information.

16 Claims, 14 Drawing Sheets

(56) References Cited

U.S. PATENT DOCUMENTS

| | | | |
|---|---|---|---|
| 2009/0168745 A1* | 7/2009 | Ahmadi et al. | 370/350 |
| 2009/0252077 A1* | 10/2009 | Khandekar et al. | 370/312 |
| 2009/0262848 A1* | 10/2009 | Choi et al. | 375/260 |
| 2010/0203866 A1* | 8/2010 | Li et al. | 455/411 |
| 2010/0208679 A1* | 8/2010 | Papasakellariou et al. | 370/329 |
| 2010/0227569 A1* | 9/2010 | Bala et al. | 455/73 |
| 2010/0255851 A1* | 10/2010 | Kwak et al. | 455/450 |
| 2010/0260081 A1* | 10/2010 | Damnjanovic et al. | 370/281 |
| 2010/0278123 A1* | 11/2010 | Fong et al. | 370/329 |
| 2010/0284339 A1* | 11/2010 | Noh et al. | 370/328 |
| 2010/0316014 A1* | 12/2010 | Choi et al. | 370/329 |
| 2011/0002309 A1* | 1/2011 | Park et al. | 370/335 |
| 2011/0002320 A1* | 1/2011 | Yuk et al. | 370/338 |
| 2011/0019622 A1* | 1/2011 | Lee et al. | 370/328 |
| 2011/0096715 A1* | 4/2011 | Park et al. | 370/315 |
| 2011/0188594 A1* | 8/2011 | Kim et al. | 375/260 |
| 2011/0201333 A1* | 8/2011 | Kwon et al. | 455/434 |
| 2011/0274102 A1* | 11/2011 | Kim et al. | 370/350 |
| 2011/0299449 A1* | 12/2011 | Kwon et al. | 370/312 |
| 2012/0002575 A1* | 1/2012 | Noh et al. | 370/280 |
| 2012/0008586 A1* | 1/2012 | Kwon et al. | 370/329 |
| 2012/0033647 A1* | 2/2012 | Moon et al. | 370/336 |
| 2012/0039256 A1* | 2/2012 | Kwon et al. | 370/328 |
| 2012/0269136 A1* | 10/2012 | Seo et al. | 370/329 |

* cited by examiner (a) Control - Plane Protocol Stack (b) User - Plane Protocol Stack

METHOD AND APPARATUS FOR TRANSMITTING SYSTEM INFORMATION FROM A BASE STATION SUPPORTING AN IMPROVED SYSTEM

CROSS-REFERENCE TO RELATED APPLICATIONS

This application is a 371 U.S. national stage application of International Application No. PCT/KR2010/002260, filed on Apr. 13, 2010, which claims priority to U.S. Provisional Application Ser. No. 61/168,636, filed on Apr. 13, 2009, the contents of which are incorporated by reference herein in their entirety.

TECHNICAL FIELD

The present invention relates to a radio communication system. More particularly, the present invention relates to a method for configuring a carrier accessible by both legacy user equipment and new user equipment and an apparatus for the same.

BACKGROUND ART

Current radio communication systems are developed such that they provide services requiring a high transfer rate, such as broadcast, multimedia images, multimedia messages, etc. Particularly, a new radio communication system capable of using a wider bandwidth and supporting a downlink maximum data rate of 1 Gbps and an uplink maximum data rate of 500 Mbps is being developed. With this development trend, newly developed radio communication systems introduce previously unused technologies. For example, introduction of an 8Tx downlink antenna construction technique, a 4Tx uplink antenna construction technique, a relay technique for improving the performance of a radio network, a carrier aggregation technique, an OFDMA transmission technique on an uplink, etc. is discussed to construct a new radio communication system.

With the improvement of system performance and introduction of new technology, structures such as a frame form and a physical signal system used on a radio channel may be changed. Accordingly, system equipment such as a base station performs communication with user equipment according to a new structure, and the user equipment need to perform communication in response to the new structure. However, it is difficult for all user equipment to operate according to the new structure in a moment, and thus a legacy system and a new system coexist. Accordingly, the new system needs to support both user equipment operating based on a legacy structure and user equipment operating based on the new structure. Therefore, an alternative for performing communication supporting the new structure while having backward compatibility with the legacy structure is required.

DISCLOSURE

Technical Problem

An object of the present invention devised to solve the problem lies on a method and an apparatus for configuring a carrier to support both user equipment implemented depending on a legacy system and user equipment implemented depending on a new system.

It will be appreciated by person skilled in the art that the objects that could be achieved with the present invention are not limited to what has been particularly described hereinabove and the above and other objects that the present invention could achieve will be more clearly understood from the following detailed description.

Technical Solution

In accordance with one aspect of the present invention, a method for transmitting system information from a base station that supports a legacy system and an improved system having one or more functions added to the legacy system includes the steps of: transmitting a broadcast channel, containing system information for supporting user equipment for the legacy system, in a predetermined number of symbols which follow a synchronous channel in a first subframe of a radio frame containing a plurality of subframes; and transmitting additional system information for supporting user equipment for the improved system in a second subframe, excluding the first subframe, from among the plurality of subframes.

In accordance with another aspect of the present invention, a base station that supports a legacy system and an improved system having one or more functions added to the legacy system includes a transmitter configured to transmit a radio frame including a plurality of subframes, and a processor for controlling the transmitter to transmit a broadcast channel, containing system information for supporting user equipment for the legacy system, in a predetermined number of symbols which follow a synchronous channel in a first subframe of the radio frame and controlling the transmitter to transmit additional system information for supporting user equipment for the improved system in a second subframe, excluding the first subframe, from among the plurality of subframes.

In the aspects of the present invention, the additional system information may be contained in a broadcast channel different from the broadcast channel of the first subframe and transmitted in the second subframe, and the different broadcast may be masked with a CRC different from a CRC applied to the broadcast channel of the first subframe.

In the aspects of the present invention, a master information block in the broadcast channel of the first subframe may contain information that represents the presence of the different broadcast channel.

In the aspects of the present invention, the radio frame may be composed of ten subframes subframe#0 to subframe#9, the first subframe may correspond to the $0^{th}$ subframe subframe#0 from among the ten subframes and the second subframe may correspond to one of the $0^{th}$, fourth, fifth and ninth subframes subframes#0, #4, #5 and #9.

In the aspects of the present invention, the radio frame may be composed of ten subframes subframe#0 to subframe#9, the first subframe may correspond to the $0^{th}$ subframe subframe#0 from among the ten subframes, the second subframe may correspond the fifth subframe subframe#5 from among the ten subframes, and the predetermined number of symbols transmitting the different broadcast channel may correspond to four leading symbols of slot#11 from slot#10 and slot#11 constructing the fifth subframe.

In the aspects of the present invention, the additional system information may be contained in a system information block and transmitted in the second subframe.

In the aspects of the present invention, the master information block in the broadcast channel of the first subframe may contain information that represents the presence of the additional system information.

In the aspects of the present invention, the radio frame may be composed of ten subframes subframe#0 to subframe#9, the first subframe may correspond to the $0^{th}$ subframe subframe#0 from among the ten subframes and the second subframe may correspond to one of downlink subframes excluding a $0^{th}$ subframe subframe#0.

Advantageous Effects

According to the present invention, user equipment implemented according to a legacy system can operate in a new radio communication system as well as the legacy radio communication system.

Furthermore, according to the present invention, radio frames in the same form can be transmitted without discriminating radio frames which will be provided to the legacy user equipment from radio frames which will be provided to new user equipment.

It will be appreciated by persons skilled in the art that the effects that could be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Embodiments of the present invention will be described in detail with reference to the accompanying drawings so that the configuration, operation and other features of the present invention will be easily understood. Embodiments of the present invention can be used in various wireless access systems such as CDMA, FDMA, TDMA, OFDMA, SC-FDMA, MC-FDMA, etc. CDMA may be implemented with a radio technology such as UTRA (Universal Terrestrial Radio Access) or CDMA2000. TDMA may be implemented with a radio technology such as GSM (Global System for Mobile communication)/GPRS (General Packet Radio Service)/EDGE (Enhanced Data Rates for GSM Evolution). OFDMA may be implemented with a radio technology such as IEEE 802.11 (W-Fi), IEEE 802.16 (WiMAX), IEEE 802-20, evolved-UTRA (E-UTRA) etc. The UTRA is a part of a UMTS (Universal Mobile Telecommunication System). 3GPP ($3^{rd}$ Generation Partnership Project) LED (Long Term Evolution) is a part of an E-UMTS (Evolved-UMTS) using the E-URTA. LTE-A (LTE-Advanced) is an evolution of 3GPP LTE.

The following embodiments describe a case in which technical features of the present invention are applied to a 3GPP system. However, the technical features of the present invention are not limited thereto.

Figure 1:
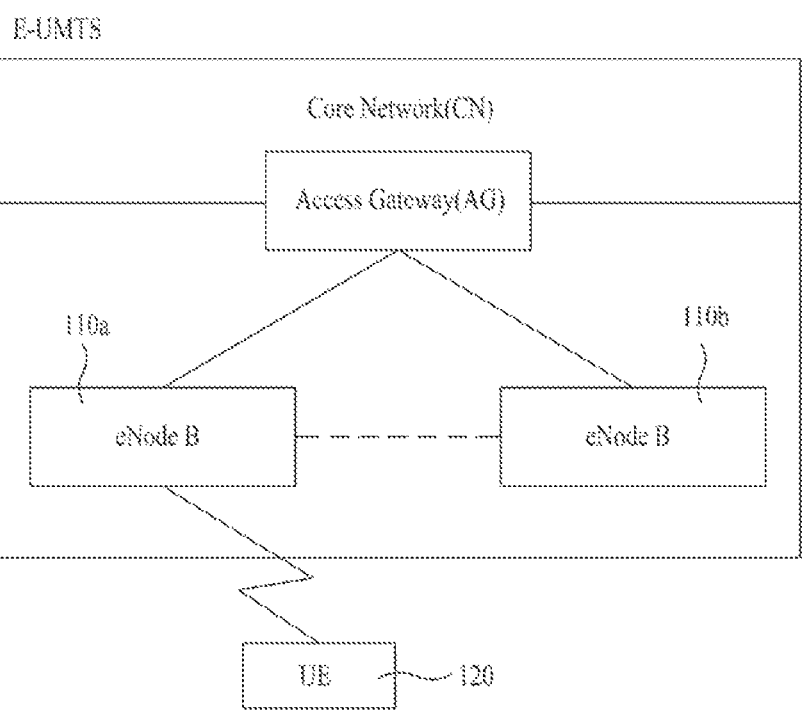
FIG. 1 shows a network configuration of E-UMTS (Evolved Universal Mobile Telecommunication System)

FIG. 1 shows a network configuration of E-UMTS (Evolved Universal Mobile Telecommunication System).

Referring to FIG. 1, the E-UMTS includes user equipment (UE) 120, a base station (eNB) 110a and 100b, and an access gateway (AG) located at the end of a network (E-UTRAN) and connected to an external network. The base station can simultaneously transmit multiple data streams for a broadcast service, multicast service and/or unicast service. One base station includes one or more cells. A cell may be set to one of bandwidths of 1.25 MHz, 2.5 MHz, 5 MHz, 10 MHz, 15 MHz and 20 MHz. Different cells may provide different bandwidths. The base station controls data transmission/reception for a plurality of user equipment. The base station transmits downlink scheduling information about downlink data to corresponding user equipment and inform the corresponding user equipment of a time/frequency domain in which the data will be transmitted, coding, data size, HARQ (Hybrid Automated Repeat and request) related information, etc. In addition, the base station transmits uplink scheduling information about uplink data to corresponding user equipment to inform the corresponding user equipment of a time/frequency domain that can be used by the user equipment, coding, data size, HARQ (Hybrid Automated Repeat and request) related information, etc. A core network (CN) may be configured with a network node for the AG and user registration of the user equipment. The AG manages mobility of the user equipment in a TA (Tracking Area) unit composed of a plurality of cells.

For reference, the user equipment 120 may be fixed or may have mobility and includes a variety of devices which communicate with the base stations 110a and 110b to transmit and receive user data and/or control information. The user equipment may be referred to as terminal equipment, MS (Mobile Station), MT (Mobile Terminal), UT (User Terminal), SS (Subscriber Station), wireless modem, handheld device, etc. The base station 110 means a fixed station which communicates with the user equipment 120 and/or another base station 110 in general, and communicates with the user equipment 120 and the other base station 110 to exchange data and control information. The base station 110 may be referred to as BTS (Base Transceiver System), access point, etc.

Hereinafter, a downlink means a communication link used for the transmission of signals from the base station 110 to the user equipment 120, and an uplink means a communication link used for the transmission of signals from the user equipment 120 to the base station 110. A transmitter means a fixed and/or mobile node which provides a data service or voice service, and a receiver means a fixed and/or mobile node which receives a data service or voice service. The transmitter may be a part of the base station 110 and the receiver may be a part of the user equipment 120. Similarly, the transmitter may be a part of the user equipment 120 and the receiver may be a part of the base station 110 in the uplink.

Figure 2:
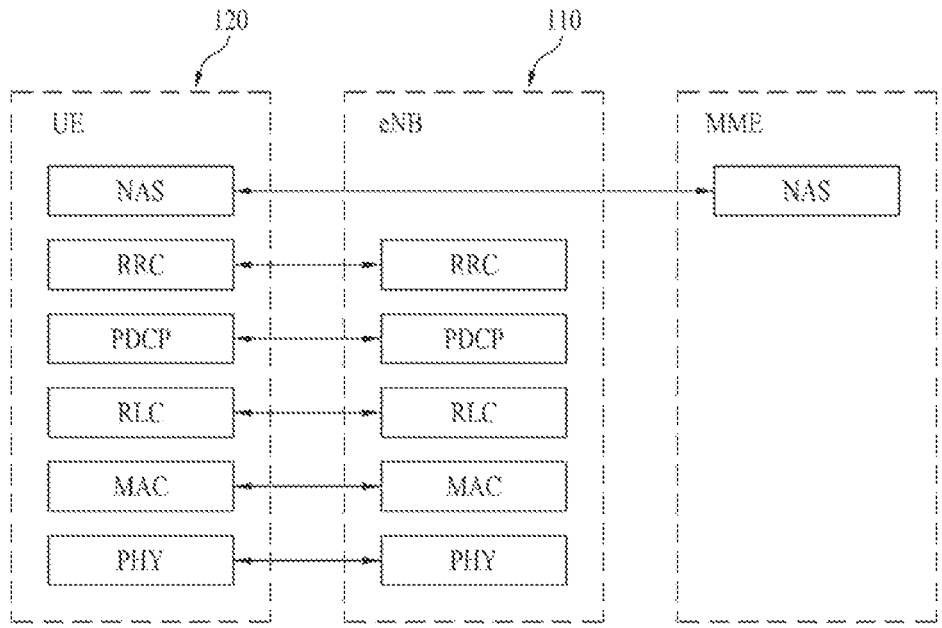
FIG. 2 shows structures of a control plane and a user plane of a radio interface protocol between user equipment and E-UTRAN based on 3GPP radio access network standard.
Figure 2:
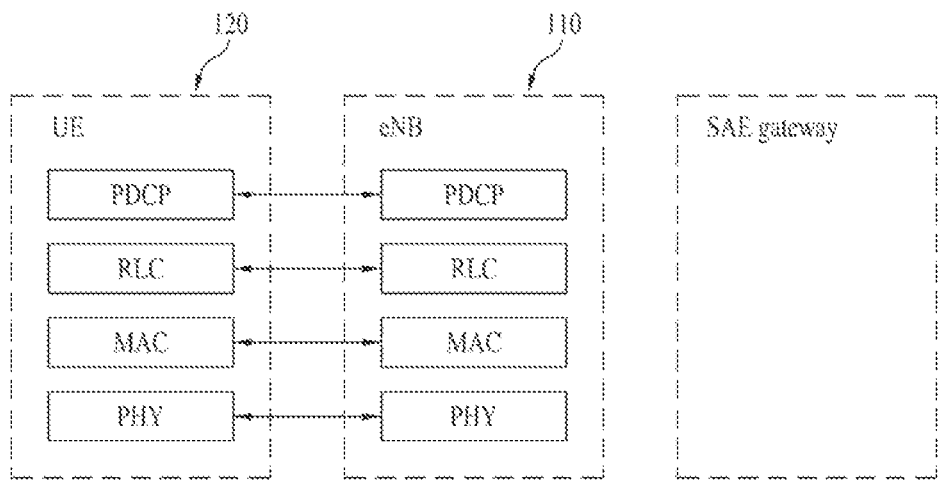

FIG. 2 shows structures of a control plane and a user plane of a radio interface protocol between user equipment and E-UTRAN based on 3GPP radio access network standard. The control plane is a path through which control messages used for the user equipment and network to manage calls are transmitted. The user plane is a path through which data generated in an application layer, for example, audio data or Internet packet data is transmitted.

A physical layer PHY corresponding to a first layer provides an information transfer service to an upper layer using a physical channel. The physical layer is connected to a medium access control (MAC) layer that is an upper layer through a transport channel. Data is transferred between the MAC layer and the PHY layer through the transport channel. Data is transferred between PHY layers of a transmitter and a receiver through the physical channel. The physical channel uses time and frequencies as radio resources. Specifically, the physical channel is modulated with OFDMA in the downlink and modulated with SC-FDMA in the uplink.

The MAC layer corresponding to a second layer provides a service to a radio link control (RLC) layer that is an upper layer through a logical channel. The RLC layer corresponding to the second layer supports reliable data transmission. The function of the RLC layer may be implemented by an internal function block of the MAC layer. A PDCP (Packet Data Convergence Protocol) layer corresponding to the second layer performs a header compression function for reducing unnecessary control information in order to efficiently transmit IP packet such as IPv4 or IPv6 in a radio interface having a narrow bandwidth.

A RRC (Radio Resource Control) layer corresponding to the lowest layer of a third layer is defined in the control plane only. The RRC layer controls the logical channel, transport channel and physical channel in relation to configuration, re-configuration and release of radio bearers (RBs). A radio bearer (RB) means a service provided by the second layer for data transmission between the user equipment and network. For this, RRC layers of the user equipment and network exchange a RRC message each other. The user equipment is in a RRC connected mode if the RRC layers of the user equipment and network are RRC connected, and the user equipment is in an idle mode if not. A NAS (Non-Access Stratum) layer corresponding to an upper layer of the RRC layer performs functions such as session management, mobility management, etc.

A downlink transport channel that carries data from a network to user equipment includes a BCH (Broadcast channel) that carries system information, PCH (Paging Channel) that carries a paging message, DL-SCH (Downlink Shared Channel) that carries a user traffic or control message, etc. An uplink transport channel that carries data from the UE to the network includes a RACH (Random Access Channel) that carries an initial control message and an UL-SCH (Uplink Shared Channel) that carries a user traffic or control message.

Figure 3:
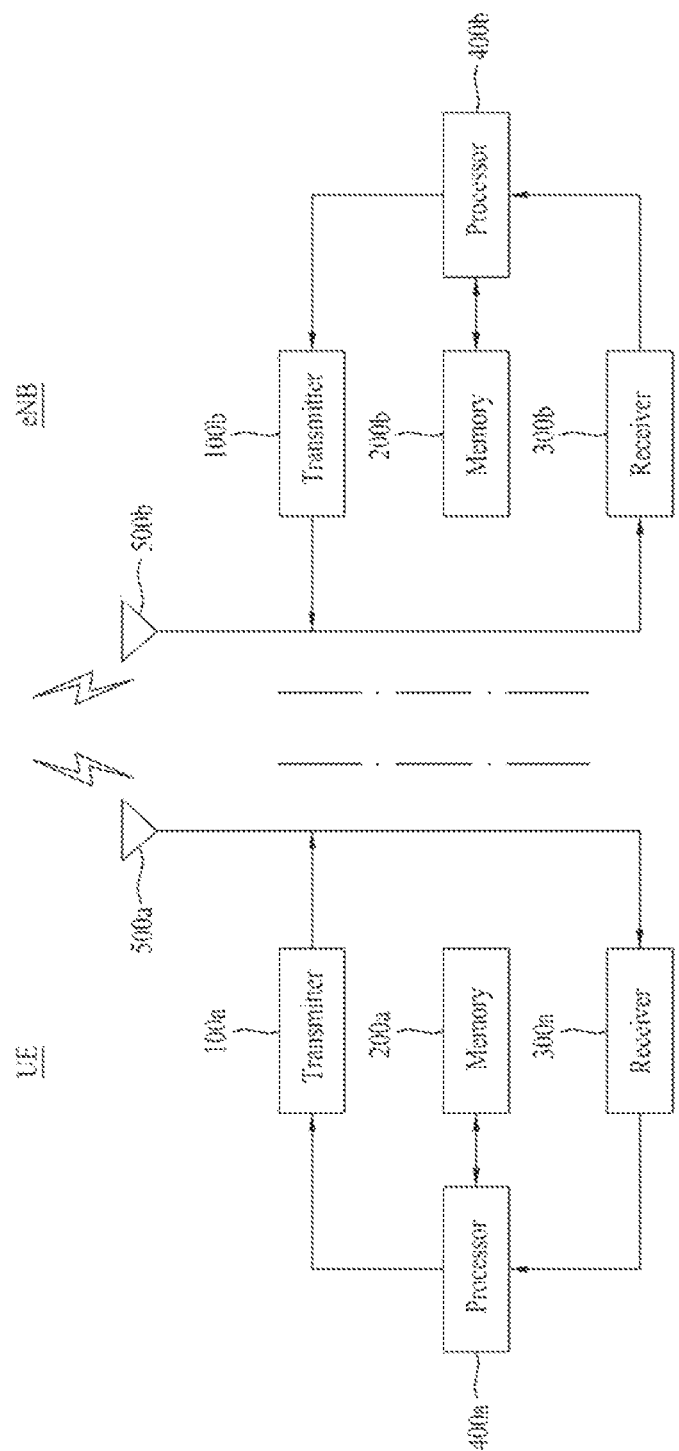
FIG. 3 is a block diagram showing components of user equipment and a base station which implement the present invention.

FIG. 3 is a block diagram showing components of the user equipment and base station which implement the present invention.

The user equipment 120 operates as a transmitter on an uplink and operates as a receiver on a downlink. The base station 110 may operate as a receiver on the uplink.

The user equipment 120 and the base station 110 respectively include antennas 500*a* and 500*b* capable of receiving information and/or data, signals, messages, etc., transmitters 100*a* and 100*b* which control the antennas to transmit messages, receivers 300*a* and 300*b* which control the antennas to receive messages, and memories 200*a* and 200*b* storing information related to communication in the radio communication system. In addition, the user equipment 120 and the base station 110 respectively include processors 400*a* and 400*b* which are configured to control the components of the user equipment 120 and the base station 110, such as the transmitters, receivers, memories, etc., to implement the present invention. The transmitter 110*a*, receiver 300*a*, memory 200*a* and processor 400*a* of the user equipment 120 may be implemented as independent components by separate chips, or two or more of them may be implemented by one chip. In the same manner, the transmitter 110*b*, receiver 300*b*, memory 200*b* and processor 400*b* of the base station 110 may be implemented as independent components by separate chips, or two or more of them may be implemented by one chip.

The antennas 500*a* and 500*b* transmit signals generated from the transmitters 100*a* and 100*b* to the outside or receive external radio signals and transmit the received signals to the receivers 300*a* and 300*b*. A transceiver module that supports a MIMO (Multi-Input Multi-Output) function that transmits and receives data using a plurality of antennas may be connected with two or more antennas.

The processors 400*a* and 400*b* conventionally control the overall operations of modules in the user equipment 120 and the base station 110. Particularly, the processors 400*a* and 400*b* can execute various control functions for implementing the present invention, a function of variably controlling a MAC (Medium Access Control) frame depending on service characteristic and propagation environment, a power saving mode function for controlling an idle mode operation, a handover function, authentication and encryption functions, etc. The processors 400*a* and 400*b* may be referred to as controllers, microcontrollers, microprocessors, microcomputers, etc. Furthermore, the processors 400*a* and 400*b* may be implemented by hardware, firmware, software, or combination thereof. In a case in which the present invention is implemented using hardware, the processors 400*a* and 400*b* may include ASICs (Application Specific Integrated Circuits), DSPs (Digital Signal Processors), DSPDs (Digital Signal Processing Devices), PLDs (Programmable Logic Devices), FPGAs (Field Programmable Gate Arrays), etc., which are configured to implement the present invention. When the present invention is implemented using firmware or software, the firmware or software may be implemented such that it includes a module, a procedure, or a function, which performs functions or operations of the present invention. The firmware or software constructed to implement the present invention may be included in the processors 400*a* and 400*b* or stored in the memories 200*a* and 200*b*, and executed by the processors 400*a* and 400*b*.

The transmitters 100*a* and 100*b* perform coding or modulation on signals and/or data which are scheduled by the processors 400*a* and 400*b* and will be transmitted to the outside, and then deliver the coded or modulated signals and/or data to the antennas 500*a* and 500*b*. In addition, the transmitters 100*a* and 100*b* convert a data stream to be transmitted into K signal sequences through demultiplexing, channel coding, and modulation. The K signal sequences are transmitted through the antennas 500*a* and 500*b* via a transmission processor in the transmitters. The transmitters 100*a* and 100*b* and the receivers 300*a* and 300*b* of the user equipment 120 and the base station 110 may be configured depending on procedures of processing a transmission signal and a received signal.

Figure 4:
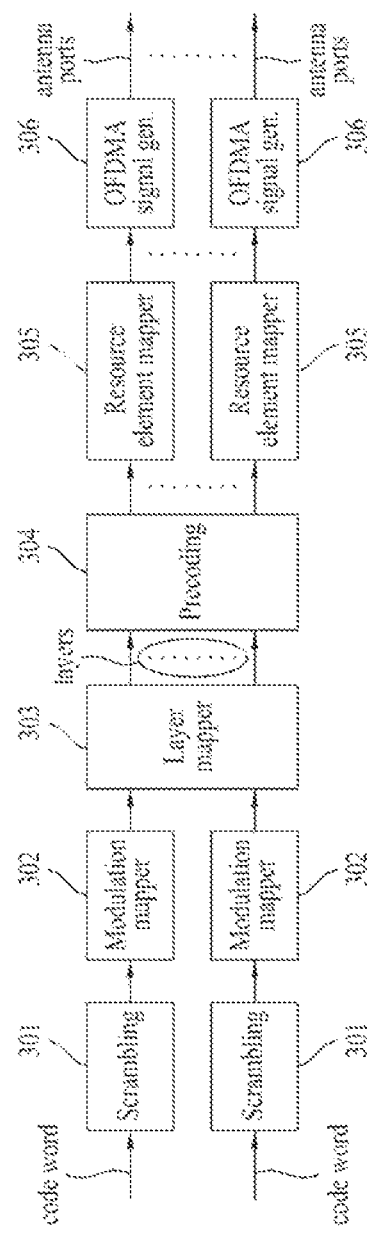
FIG. 4 shows a signal processing procedure according to OFDMA (Orthogonal Frequency Division Multiple Access)

FIG. 4 shows a signal processing procedure according to OFDMA (Orthogonal Frequency Division Multiple Access).

The transmitter in the user equipment or the base station can transmit one or more codewords. The one or more codewords may be scrambled by a scrambler 301 and modulated into modulated symbols by a modulation mapper 302. A layer mapper 303 maps the modulated symbols to one or more transport layers, and a precoder 304 multiplies the modulated symbols of the transport layers by a predetermined precoding matrix selected on the basis of a channel state and outputs modulated symbols for respective antennas. The precoder 304 may use both codebook and non-codebook methods. The demodulated symbols for respective antennas are mapped to time-frequency resource elements to be used for transmission by a resource element mapper 305, and the demodulated symbols for respective antennas, mapped to the time-frequency resource elements, are converted into OFDM signals for respective antenna ports by an OFDM signal generator 306 and transmitted to the respective antenna ports.

For reference, OFDMA is widely used for downlink transmission because it can improve frequency efficiency and cell capacity. However, introduction of OFDMA to uplink transmission is considered in a new radio communication system.

Figure 5:
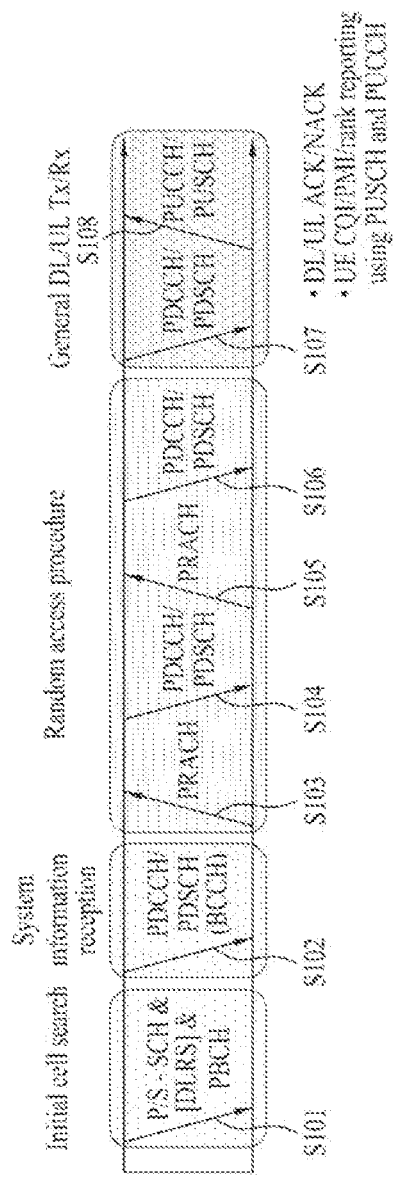
FIG. 5 illustrates a physical channel of LTE system and signal transmission using the same.

FIG. 5 illustrates a physical channel of LTE system and signal transmission using the same.

User equipment performs an initial cell search operation such as synchronization with a base station when the user equipment is powered on or enters a new cell (S101). To achieve this, user equipment can receive a primary synchronization channel (P-SCH) and a secondary synchronization channel (S-SCH) from the base station to be synchronized with the base station, and acquire information such as cell ID, etc. Then, the user equipment can receive a physical broadcast channel (PBCH) from the base station to acquire broadcast information in the cell.

The user equipment which completes initial cell search can acquire more detailed system information by receiving a physical downlink control channel (PDCCH) and physical downlink shared channel (PDSCH) according to information contained in the PDCCH (S102).

If the user equipment initially accesses the base station or has no radio resource for signal transmission, the user equipment may perform a random access procedure for the base station (S103 to S106). To achieve this, the user equipment can transmit a specific sequence as a preamble through a physical random access channel (PRACH) (S103 and S105) and receive a response message to the preamble through PDCCH and corresponding PDSCH (S104 and S106). In the case of competition based RACH, a contention resolution procedure may be additionally performed.

Upon the completion of the above procedure, the user equipment may receive PDCCH/PDSCH (S107) and transmit physical uplink shared channel (PUSCH)/physical uplink control channel (PUCCH) (108) as a normal uplink/downlink signal transmission procedure. Control information transmitted from the user equipment to the base station through an uplink or transmitted from the base station to the user equipment includes a downlink/uplink ACK/NACK signal, CQI (Channel Quality Indicator), PMI (Precoding Matrix Index), SR (Scheduling Request), RI (Rank Indicator), etc. In the case of 3GPP LTE system, the user equipment can transmit the control information such as CQI/PMI/RI through PUSCH and/or PUCCH.

Figure 6:
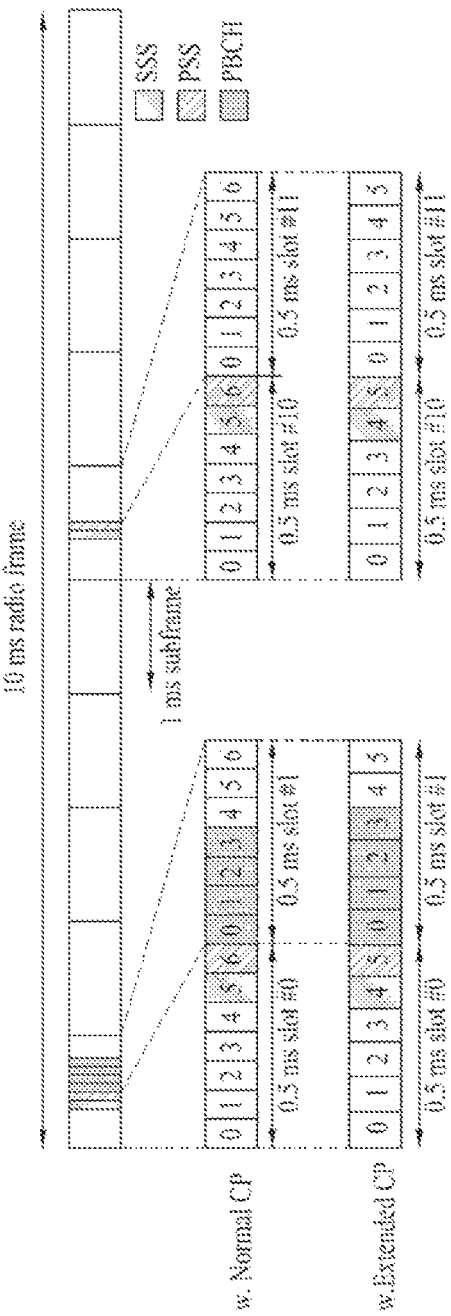
FIG. 6 shows an exemplary structure of a radio frame used in LTE.

FIG. 6 shows an exemplary structure of a radio frame used in LTE.

Particularly, FIG. 6 shows a radio frame structure that can be used for frequency division duplex (FDD). Referring to FIG. 6, a radio frame has a length of 10 ms ($327200 \cdot T_s$) and consists of ten subframes having an equal size. Each subframe has a length of 1 ms and is composed of two slots. Each slot has a length of 0.5 ms ($15360 \cdot T_s$). Here, $T_s$ denotes sampling time and is represented by $T_s = 1/(15 \text{ kHz} \times 2048) = 3.2552 \times 10^{-8}$ (approximately 33 ns). The slot includes a plurality of OFDM symbols in the time domain and includes a plurality of resource blocks (RBs) in the frequency domain. In the LTE system, one resource block includes 12 subcarrier×7(6) OFDM symbols. A transmission time interval (TTI) that is a unit time for which data is transmitted may be determined in a unit of one or more subframes. The above-mentioned radio frame structure is exemplary, and the number of subframes included in the radio frame, the number of slots included in each subframe and the number of OFDM symbols included in each symbol may be changed variously.

PBCH (Physical Broadcast Channel) and SCH (Synchronization Channel) of the LTE system will now be explained in detail with reference to FIG. 6. The SCH includes P-SCH and S-SCH. A primary synchronization signal (PSS) is transmitted on the P-SCH and a secondary synchronization signal (SSS) is transmitted on the S-SCH.

A message content of the PBCH is represented by a master information block in a RRC layer. Specifically, the message content of the PBCH is represented in Table 1.

TABLE 1

| |
|---|
| -- ASN1START |
| MasterInformationBlock ::= SEQUENCE { |
| dl-Bandwidth               ENUMERATE { |
|                                   n6,n15,n25,n50,n75,n100,spare2, spare1} |
| phich-Configuration     PHICH-Configuration |
| systemFrameNumber     BIT STRING (SIZE (8)), |
| spare                      BIT STRIMG (SIZE (10)), |
| } |
| --ASN1STOP |

As shown in Table 1, the PBCH includes a downlink system bandwidth, PHICH configuration, and a system frame number (SFN). Furthermore, 10 bits (spare) are left as a reserved field in the PBCH without being used. Accordingly, LTE user equipment can be explicitly aware of information about the downlink bandwidth, SFN and PHICH configuration by receiving the PBCH. The user equipment can be implicitly aware of the number of transmit antennas at the base station by receiving the PBCH. Information about the number of transmit antennas at the base station is implicitly signaled by masking (for example, XOR operation) 16-bit CRC (Cyclic Redundancy Check) used for error detection of the PBCH with a sequence corresponding to the number of transmit antennas. A masking sequence for the number of antennas used in LTE is represented in Table 2.

TABLE 2

| Number of transmit antenna ports at eNode-B | PBCH CRC mask $<x_{ant.0}, x_{ant.1}, \ldots, x_{ant.15}>$ |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |

The PBCH is subjected to cell-specific scrambling, modulation, layer mapping and precoding, and then mapped to physical resources. In LTE, the PBCH uses only QPSK (Quadrature Phase Shift Keying) as a modulation scheme. The PBCH is mapped to a resource element (k,l) designated by Equation 1.

$$k = \frac{N_{RB}^{DL} N_{sc}^{RB}}{2} - 36 + k' \quad \text{[Equation 1]}$$
$$k' = 0, 1, \ldots, 71 \; l = 0, 1, \ldots, 3$$

Here, l denotes the OFDM symbol index of slot 1 of a $0^{th}$ subframe and k denotes a subcarrier index. Equation 1 is a mapping example on the basis of one radio frame. The coded PBCH is mapped to four subframes for 40 ms, as shown in FIG. 6. Timing 40 ms is blind-detected, and thus explicit signaling for the timing 40 ms is not present. As shown in Equation 1 and FIG. 6, the PBCH is mapped to four OFDM symbols and 72 subcarriers in one subframe. The PBCH is not mapped to a RE corresponding to a reference signal for a 4Tx antenna irrespective of the actual number of transmit antennas of the base station. For reference, the PBCH is mapped to four subframes for 40 ms and mapped to four OFDM symbols and 72 subcarriers in one subframe even in a radio frame applied to time division duplex (TDD). The PBCH is located in first to fourth OFDM symbols of the first slot (the rear slot of a $0^{th}$ subframe) and an eleventh slot (the rear slot of a fifth subframe) of the TDD radio frame.

Referring to FIG. 6, P-SCH (Primary Synchronization Channel) is located in last OFDM symbols of the $0^{th}$ slot and the tenth slot. The P-SCH is transmitted using 72 subcarriers (10 subcarriers are reserved and 62 subcarriers transmit PSS) in the corresponding OFDM symbols. In a 10 ms radio frame, the same PSS (Primary Synchronization Signal) is transmitted through the P-SCH. A code used for the PSS may be referred to as a PSC (Primary Synchronization Code). The P-SCH is used to obtain OFDM symbol synchronization, time domain synchronization and/or frequency domain synchronization such as slot synchronization. ZC (Zadoff-Chu) sequence may be used as the PSS, and at least one PSS is present in a radio communication system. For reference, in the case of a radio frame (not shown) applied to time division duplex (TDD), P-SCH is located in a second OFDM symbol of a first slot (that is, a slot located before a first subframe) and a second OFDM symbol of a twelfth symbol (that is, a slot located before a sixth subframe) in the radio frame.

$$d^u(k) = \exp\left[-j\frac{\pi u k(k+1)}{N_{zc}}\right] \text{ when } N_{ZC} \text{ is odd } nmber \quad \text{[Equation 2]}$$

$$d^u(k) = \exp\left[-j\frac{\pi u k^2}{N_{zc}}\right] \text{ when } N_{ZC} \text{ is even } nmber.$$

CAZAC sequence d(k) has the following three properties.

$$|d(k)| = 1 \text{ for all } k, N_{ZC}, u \quad \text{[Equation 3]}$$

$$R_{u,N_{ZC}}(m) = \begin{cases} 1, & \text{for } m = 0 \\ 0, & \text{for } m \neq 0 \end{cases} \quad \text{[Equation 4]}$$

$$R_{u_1;u_2;N_{ZC}}(m) = const \text{ for all } u_1, u_2 \quad \text{[Equation 5]}$$

Equation 3 represents that the CAZAC sequence has a size of 1 all the time, and Equation 4 represents that auto correlation of the CAZAC sequence is indicated by Dirac-delta function. Auto correlation is based on circular correlation. Equation 5 represents that cross correlation is a constant all the time.

In the LTE system, P-SCH is defined by a ZC sequence having a length of 62 according to Equation 6.

$$R_{u,N_{ZC}}(m) = \begin{cases} e^{-j\frac{\pi u n(n+1)}{63}}, & \text{for } n = 0, 1, \ldots, 30 \\ e^{-j\frac{\pi u(n+1)(n+1)}{63}}, & \text{for } n = 31, 32, \ldots, 61 \end{cases} \quad \text{[Equation 6]}$$

Here, root index u of the ZC sequence is given as shown in Table 3.

TABLE 3

| $N_{ID}^{(2)}$ | Root index u |
|---|---|
| 0 | 25 |
| 1 | 29 |
| 2 | 34 |

Figure 7:
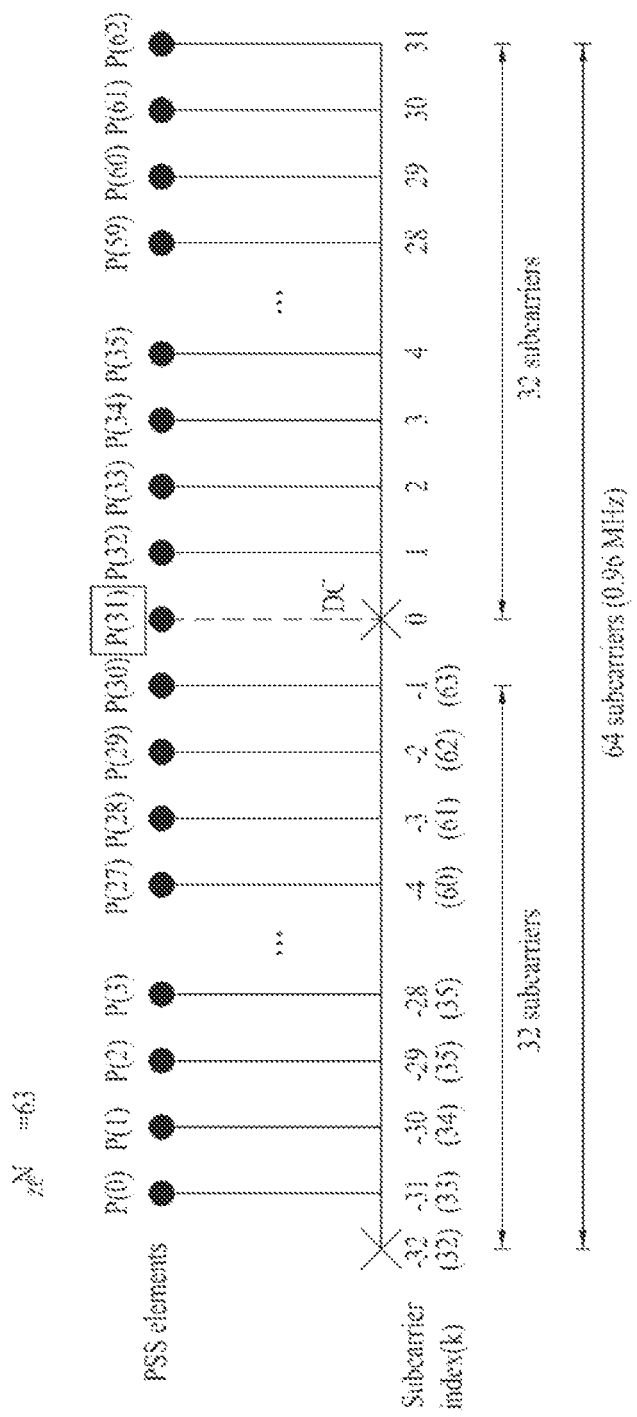
FIG. 7 illustrates an example of mapping a sequence to a P-SCH.

FIG. 7 illustrates an example of mapping a sequence to P-SCH. It is assumed that a FFT (Fast Fourier Transform) Window size is 64. Referring to FIG. 7, a ZC sequence having a length $N_{ZC}$ of 63 is mapped to 64 subcarriers including a DC subcarrier. The ZC sequence is sequentially mapped to the subcarriers from the leftmost subcarrier such that the thirty-first element P(31) of the ZC sequence is mapped to the DC subcarrier. A null value is inserted into a subcarrier (subcarrier #31) to which the sequence is not mapped in a mapping period. The sequence P(31) mapped to the DC subcarrier is punctured. Here, if the left is one side of the DC subcarrier, the other side of the DC subcarrier becomes the right. However, the left and right directions are not limited thereto. The FFT window size of P-SCH and the length of the ZC sequence can be determined in various manners, and thus a sequence mapping scheme can vary. The ZC sequence may be mapped symmetrically based on the DC subcarrier in the time domain.

S-SCH (Secondary Synchronization Channel) is located in OFDM symbols right before the last OFDM symbols of the $0^{th}$ slot and the tenth slot. S-SCH and P-SCH are located in neighboring OFDM symbols. S-SCH is transmitted using 72 subcarriers (10 subcarriers are reserved and 62 subcarriers transmit SSS) in the corresponding symbol. Different SSSs (Secondary synchronization Signals) are transmitted through two S-SCHs. The S-SCH is used to obtain frame synchronization, cell group ID and/or cell CP configuration (that is, utilization information of normal CP or extended CP). Since two SSSs are used for one S-SCH, final information is transmitted through a combination of two short codes. A code used for SSS may be referred to as SSC (Secondary Synchronization Code). For example, 31 codes can be generated by circular shift of an m-sequence with a length of 31, which is generated from a polynomial of x^5+x^2+1. Accordingly, two m-sequences having a length of 31 can be mapped to one S-SCH. For reference, in the case of a radio frame (not shown) applied to time division duplex, S-SCH is located in the last OFDM symbol of the first slot (that is, the rear slot of the $0^{th}$ subframe) and the last OFDM symbol of the eleventh slot (that is, the rear slot of the fifth subframe).

An m-sequence is one of PN (Pseudo Noise) sequences. The PN sequence is reproducible and has property similar to that of the random sequence. The PN sequence has the following properties. (1) Repetition interval is sufficiently long. The random sequence has an infinite repetition interval. (2) The number of zeros and the number of ones are similar to each other in one period. (3) A portion in which a run length is 1 is 1/2, a portion in which the run length is 2 is 4/1, a portion in which the run length is 3 is 8/1, . . . . The run length represents the length of a sequence in which the same code occurs. (4) Cross-correlation between sequences is very weak in one period. (5) The overall sequence cannot be reproduced with a small sequence piece. (6) It is reproducible through an appropriate algorithm. The PN sequence includes the m-sequence, Gold sequence, Kasami sequence, etc. The m-sequence has a property that side lobe of periodic auto-correlation is −1 in addition to the above-mentioned property.

A combination (m0, m1) of two codes mapped to S-SCH can be defined by Equation 7.

$$m_0 = m' \bmod 31$$
$$m_1 = (m_0 + \lfloor m'/31 \rfloor + 1) \bmod 31$$
$$m' = N_{ID}^{(1)} + q(q+1)/2,$$
$$q = \left\lfloor \frac{N_{ID}^{(1)} + q'(q'+1)/2}{30} \right\rfloor,$$
$$q' = \lfloor N_{ID}^{(1)}/30 \rfloor$$

[Equation 7]

The relationship between cell group ID and the combination (m0, m1) of two codes can be defined as shown in Table 4.

TABLE 1

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |

TABLE 1-continued

| $N_{ID}^{(1)}$ | $m_0$ | $m_1$ |
|---|---|---|
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |

TABLE 1-continued

| $N_{ID}^{(1)}$ | $m_0$ | $m_1$ |
|---|---|---|
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |

Figure 8:
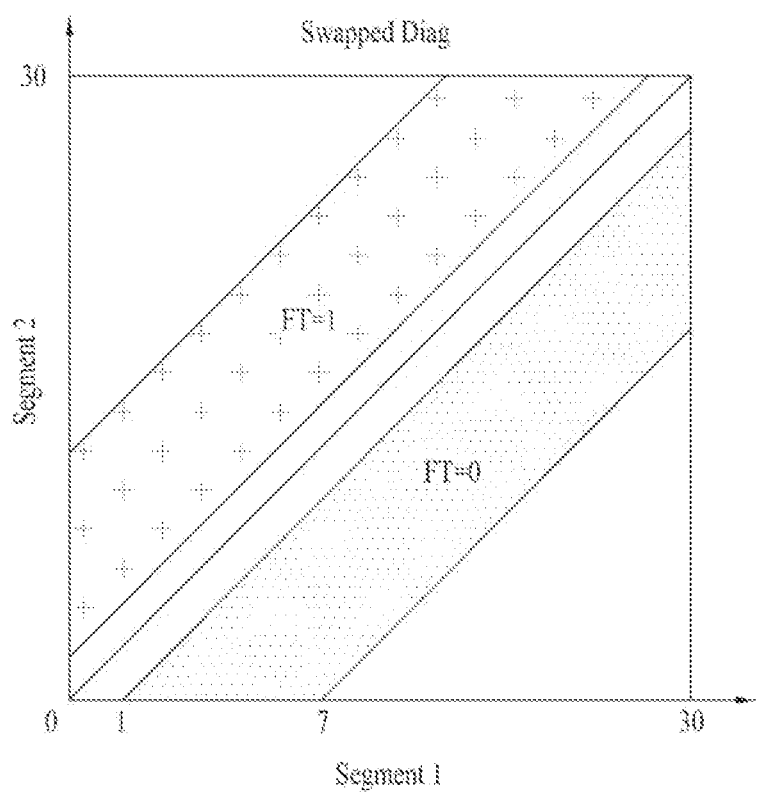
FIG. 8 shows a combination of two short codes (m0, m1) used for an S-SCH.

FIG. 8 shows the combination (m0, m1) of two short codes used for S-SCH. The sequence of m0 and m1 in the combination may represent frame timing information. For example, (m0, m1) represents a synchronization channel of the 0$^{th}$ (0 ms) subframe and (m1, m0) represents a synchronization signal of the fifth (5 ms) subframe.

Referring to FIG. 8, segment 1 represents m0 and segment 2 represents m1. FT denotes frame timing. FT=0 means SSS of 0 ms subframe, and FT=1 means SSS of 5 ms subframe. If two short codes having a length of 31 can respectively transmit 31 information items (the number of sequence sets), a total of 31*31=961 cell group IDs (information) can be transmitted using combinations of the two codes. The LTE system selects 168 combinations demonstrating optimum performance from 961 available combinations such that cell ID detection performance is maximized in consideration of inter-cell interference (Equation 7 or Table 4).

Figure 9:
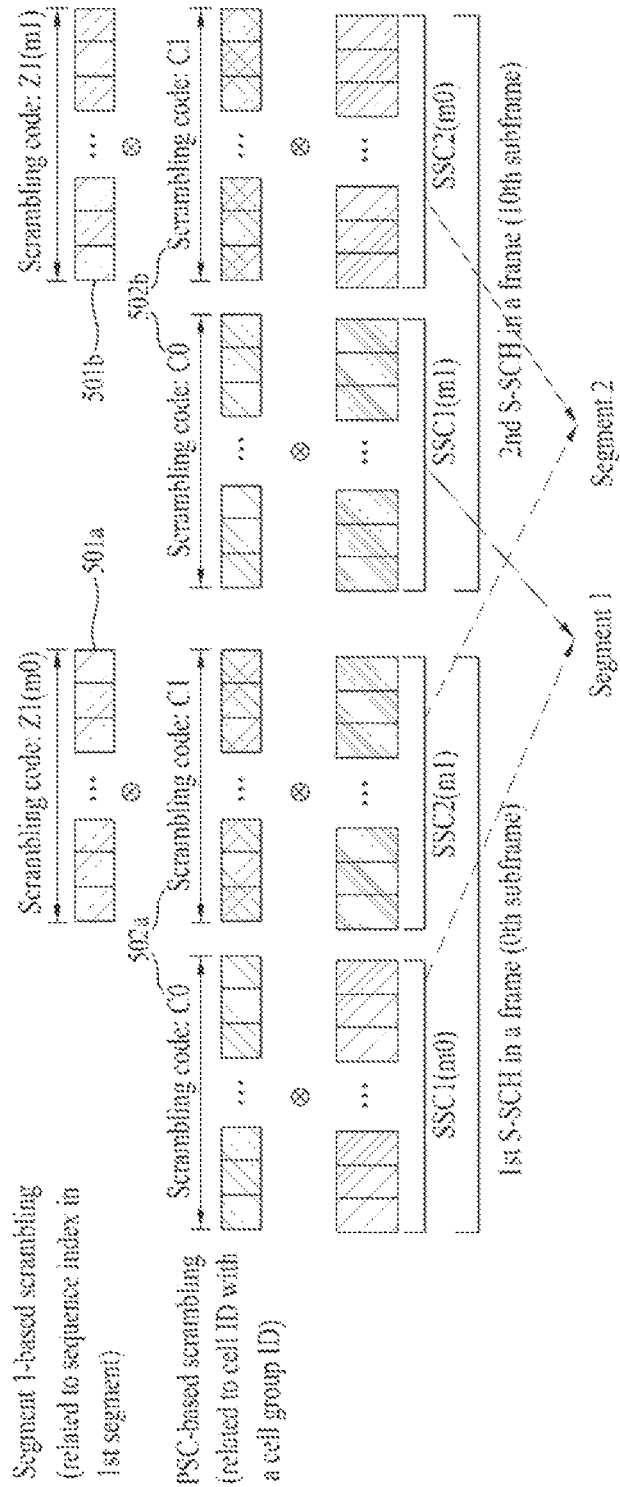
FIG. 9 shows an example of scrambling an S-SCH.

FIG. 9 shows an example of scrambling S-SCH. If cell A has a combination (1, 2) and cell B has SSS of a combination (3, 4), user equipment may erroneously detect the combinations as (1, 4) and (3, 2). It is referred to as ambiguity. Accordingly, SSC can be scrambled with codes corresponding to three PSCs in order to reduce ambiguity between neighboring cells. For example, if cell A and cell B use different PSCs and they respectively scramble SSC with their PSC-based codes, combinations (1, 2) and (3, 4) are strongly bound to reduce probability of ambiguity. PSC-based scrambling codes are based on an m-sequence having a length of 31, which is generated from $x^5+x^2+1$. Six sequences are generated by circular shift, and pairs of the sequences correspond to three PSCs.

Even though PSC-based scrambling is applied, there is still possibility of ambiguity. For example, if cell A and cell B transmit the same PSC code in the above-mentioned example, the same scrambling code is applied to SSS since the two cells transmit the same PSC code, and thus ambiguity occurs. Accordingly, segment 1 based scrambling is additionally performed in order to reinforce the cohesion of combinations (1, 2) and (3, 4). The segment 1 based scrambling scrambles SSS of segment 2 using codes defined corresponding to indexes of segment 1. Since indexes 1 and 3 of segment 1 are different codes, segment 1 based scrambling codes differ from each other. Accordingly, the cohesion of combinations (1, 2) and (3, 4) is enhanced to solve the ambiguity problem. The segment 1 based scrambling codes are based on an m-sequence having a length of 31, which is generated from $x^5+x^4+x^2+x^1+1$. Eight sequences are generated by circular shift and correspond to indexes of segment 1 one-to-one.

SSC and scrambling codes will now be explained using expressions. Sequences d(0), . . . , d(61) used for SSS are combined by interleaving two binary sequences having a length of 31. The combined sequences are scrambled with scrambling codes given by PSS. A combination of the two sequences with length-31 in subframe 0 differs from a combination thereof in subframe 5, which are represented by Equation 8.

$$d(2n) = \begin{cases} s_0^{(m_0)}(n)c_0(n) & \text{in subframe 0} \\ s_1^{(m_1)}(n)c_0(n) & \text{in subframe 5} \end{cases}$$ [Equation 8]

$$d(2n+1) = \begin{cases} s_1^{(m_1)}(n)c_1(n)z_1^{(m_1)}(n) & \text{in subframe 0} \\ s_0^{(m_0)}(n)c_1(n)z_1^{(m_1)}(n) & \text{in subframe 5} \end{cases}$$

Here, $0 \leq n \leq 30$, and $m_0$ and $m_1$ are related to a physical cell ID group $N_{ID}^{(I)}$ and defined as represented in Equation 7 and Table 4. Sequences $s_0^{(m_0)}(n)$ and $s_1^{(m_1)}(n)$ are obtained by circular shift of m-sequence $\tilde{s}(n)$ as represented by Equation 9.

$$s_0^{(m_0)}(n) = \tilde{s}((n+m_0) \bmod 31)$$

$$s_1^{(m_1)}(n) = \tilde{s}((n+m_1) \bmod 31)$$ [Equation 9]

Here, $\tilde{s}(i) = 1-2x(i)$, $0 \leq i \leq 30$, $x(i+5)=(x(i+2)+x(i)) \bmod 2$, $0 \leq i \leq 25$, and initial conditions are $x(0)=0$, $x(1)=0$, $x(2)=0$, $x(3)=0$, and $x(4)=1$.

Scrambling sequences $c_0(n)$ and $c_1(n)$ are based on PSS and obtained by circular shift of m-sequence $\tilde{c}(n)$ as represented by Equation 10.

$$c_0(n) = \tilde{c}((n+N_{ID}^{(2)}) \bmod 31)$$

$$c_1(n) = \tilde{c}((n+N_{ID}^{(2)}+3) \bmod 31)$$ [Equation 10]

Here, $N_{ID}$ represents physical cell ID in the physical cell ID group $N_{ID}^{(1)}$. $\tilde{c}(i)=1-2x(i)$, $0 \leq i \leq 30$, $x(i+5)=(x(i+3)+x(i))$ mod 2, $0 \leq i \leq 25$, and initial conditions are $x(0)=0$, $x(1)=0$, $x(2)=0$, $x(3)=0$, and $x(4)=1$.

Scrambling sequences $z_1^{(m_0)}(n)$ 와 $z_1^{(m_1)}(n)$ are obtained by circular shift of m-sequence $\tilde{z}(n)$ as represented by Equation 11.

$$z_1^{(m_0)}(n)=\tilde{z}((n+(m_0 \bmod 8))\bmod 31)$$

$$z_1^{(m_1)}(n)=\tilde{z}((n+(m_1 \bmod 8))\bmod 31) \quad \text{[Equation 11]}$$

Here, m0 and m1 are as defined above. $\tilde{z}(i)=1-2x(i)$, $0 \leq i \leq 30$, $x(i+5)=(x(i+4)+x(i+2)+x(i+1)+x(i))$ mod 2, $0 \leq i \leq 25$, and initial conditions are $x(0)=0$, $x(1)=0$, $x(2)=0$, $x(3)=0$, and $x(4)=1$.

Final physical cell IDs are defined as $N_{ID}^{cell}=3N_{ID}^{(1)}+N_{ID}^{(2)}$ according to a combination of $N_{ID}^{(2)}$ of PSS and $N_{ID}^{(1)}$ of SSS, and currently 504 (=3*168) physical cell IDs are defined in LTE.

The LTE system uses a single uplink/downlink band and supports uplink antenna configuration of up to 2Tx and downlink antenna configuration of up to 4Tx. The LTE system does not support CoMP and relay. On the contrary, the LTE-A system that is an advanced LTE system employs carrier aggregation or bandwidth aggregation technology which aggregates a plurality of uplink/downlink frequency blocks to use a wider uplink/downlink bandwidth in order to use a wider frequency band. Carriers in the LTE system may be referred to as component carriers in the LTE-A system. The LTE-A system can use a maximum of four uplink antennas and use a maximum of eight downlink antennas. In addition, it is discussed that the LTE-A system supports CoMP and relay which are not supported by the LTE system.

For convenience of explanation, a LTE system that has a system bandwidth composed of a single component carrier, supports 2Tx uplink antennas and 4Tx downlink antennas and does not support CoMP and relay is referred to as a legacy system. On the other hand, a system that has a system bandwidth including a plurality of component carriers, supports Tx uplink antenna and 4Tx downlink antennas, and can use at least one component carrier for the legacy system is referred to as an evolved system or improved system. For example, LTE (Release-8) system and LTE-A (Release-9) system are in relation of the legacy system and the evolved system. Accordingly, the LTE system may be referred to as the legacy system and user equipment supporting the LTE system may be referred to as LTE user equipment, legacy user equipment or legacy user equipment. Likewise, the LTE-A system may be referred to as the evolved system, improved system or new system and user equipment supporting the LTE-A system may be referred to as evolved user equipment, improved user equipment or new user equipment.

The LTE-A system needs to support both the LTE user equipment and LTE-A user equipment. The LTE-A user equipment needs to be implemented to receive carriers according to the LTE system as well as the LTE-A system and reproduce control information and data transmitted through the carriers. When a device according to an evolved system can use a signal and data according to a conventional system, it is said that the evolved system supports forward compatibility. The LTE user equipment may use data in a component carrier according to the LTE-A system or not depending on the configuration of the component carrier. When the LTE user equipment can process and use control information and data transmitted through the component carrier according to the LTE-A system to perform communication, it is said that the LTE-A system has backward compatibility.

Embodiments of the present invention to set a radio frame to support both forward compatibility and backward compatibility will now be explained. To allow the LTE user equipment to process a signal transmitted through a carrier according to LTE-A while enabling the LTE-A user equipment to implement new technology introduced to LTE-A in the LTE-A system, both the LTE user equipment and LTE-A user equipment need to process control information included in radio frames contained in component carriers to perform communication according to a corresponding system.

To enable user equipment to perform communication according to a corresponding system, it is necessary to perform a cell search procedure as described above with reference to FIG. 5 to determine time and frequency parameters required to perform demodulation of a downlink signal and transmission of an uplink signal at correct time and acquire system information required for system configuration of the user equipment from a base station.

The system information is composed of a master information block (MIB) and system information blocks (SIBs). The system information blocks include a set of functionally related parameters and are classified into the master information block (MIB), system information block type 1 (SIB1), system information block type 2 (SIB2), SIB3 to SIB8 according to included parameters.

The MIB includes parameters most frequently transmitted, which are necessary for user equipment to initially access a network. The SIB1 includes parameters required to determine whether or not a specific cell is suitable for cell selection as well as information about time-domain scheduling of other SIBs. The SIB2 includes common and shared channel information. The SIB3 to SIB8 include parameters used to control an intra frequency, inter frequency, inter RAT (Radio Access Technology) cell re-selection.

Embodiments of the present invention will now be explained. In the following description, a component carrier carrying LTE-A system information is referred to as LTE-A CC and a component carrier carrying only LTE system information is referred to as LTE CC. In addition, embodiments of the present invention to configure a component carrier when antenna configuration is set in an 8Tx downlink antenna system newly introduced to LTE-A will be explained.

Embodiment 1

Use of MIB

A base station transmits initial access information through a downlink component carrier through a downlink. The initial access information is transmitted through SCH and PBCH. The downlink component carrier of the present invention needs to be detected by both LTE user equipment and LTE-A user equipment.

In the LTE system, the base station uses PBCH CRC mask sequence exemplified in Table 2 for CRC of PBCH in order to inform the LTE user equipment of the number of transmit antennas of the base station. To enable both the LTE user equipment and LTE-A user equipment to recognize the number of transmit antennas of the base station, embodiment 1 of the present invention informs the LTE user equipment of the number of transmit antennas of the base station through the legacy PBCH CRC mask sequence and informs the LTE-A user equipment of the number of transmit antennas of the base station according to the LTE-A system through spare bits of the MIB. Information about the number of transmit antennas of the base station according to the LTE-A system may be included in the MIB and transmitted to user equipment. Table 5 represents information about the number of transmit antennas, included in the MIB.

TABLE 5

```
-- ASN1START
MasterInformationBlock ::= SEQUENCE {
    dl-Bandwidth            ENUMERATED  {n6, n15, n25,
n50,n70,n100,spare2,spare1},
    phich-Configuration   PHICH-Configuration
    systemFrameNumber      BIT STRING (SIZE(8)),
    AntennaConfiguration   ANTENNA-Configuration
    ...
}
-- ASN1STOP
```

The number of transmit antennas can be indicated using $\log_2 N$ bits. N may be the number of all kinds of antennas counts used in LTE-A. For example, if one of 1, 2, 4 and 8 antennas is used in LTE-A, N is 4 and the number of transmit antennas according to the LTE-A system can be designated using 2 bits of the spare bits of the MIB. In another example, if one of 1 to 8 antennas is used in LTE-A, N is 8 and the number of transmit antennas according to the LTE-A system can be designated using 3 bits of the spare bits of the MIB.

It is also possible to use the spare bits of the MIB only for an antenna count other than antenna counts that can be designated by CRC masking in LTE. For example, if the LTE-A system can use one of 1, 2, 4 and 8 downlink antennas, it is possible to designate whether or not the number of transmit antennas of the base station is 8 using one bit of the spare bits only when the base station uses 8 downlink antennas. If the LTE system can use 1 to 8 antennas, 5 antenna counts other than 1, 2 and 4 can be designated using 3 bits of the spare bits.

The MIB can be transmitted through a BCH (Broadcast Channel). The BCH is represented by a PBCH (Physical Broadcast Channel) in a physical layer. User equipment can acquire information about a downlink bandwidth, a system frame number and PHICH configuration from the MIB included in the PBCH by receiving the PBCH. Information blocks of the BCH including the MIB according to embodiment 1 of the present invention are masked with a sequence corresponding to the number of transmit antennas from among CRC mask sequences exemplified in Table 2, which are used for error detection of the PBCH, and then converted into the PBCH through channel coding and rate matching. The PBCH is subjected to cell-specific scrambling, modulation, layer mapping and precoding, and then mapped to physical resources and transmitted to user equipment.

According to embodiment 1 of the present invention, the LTE user equipment can recognize the number of transmit antennas from the masking sequence of the PBCH and the LTE-A user equipment can recognize the number of transmit antennas according to the LTE-A system from the MIB transmitted through the PBCH.

Referring to FIGS. 3 and 4, the processor 400b of the base station sets that a part of the spare bits of the MIB in the LTE system represents the number of transmit antennas for the LTE-A user equipment, and masks a PBCH CRC mask sequence corresponding to the number of transmit antennas for the LTE user equipment. Furthermore, the processor 400b of the base station controls the scrambler 301 to scramble the masked PBCH and controls the modulation mapper 302 to modulate the scrambled PBCH into complex symbols. The layer mapper 303 maps the complex symbols to one or more transport layers under the control of the processor 400b of the base station, and the precoder 304 multiplies the complex symbols of the transport layers by a precoding matrix selected based on channel state to output complex symbols for respective antennas under the control of the processor 400b. The processor 400b of the base station controls the resource element mapper 305 to map the complex symbols for the respective antennas to time-frequency resource elements to be used for transmission. The OFDMA signal generator 306 converts the complex symbols for the respective antennas, which are mapped to the time-frequency resource elements, into OFDM signals for respective antenna ports and transmits the OFDM signals to the respective antenna ports under the control of the processor 400b of the base station. The number of antennas used for transmission among the antennas 500b of the base station corresponds to at least one of the number of antennas, implicitly represented in the PBCH CRC mask, and the number of antennas, explicitly represented in the MIB.

The receiver of the LTE user equipment decodes and demodulates OFDM symbol signals received through antennas and transmits the decoded and demodulated signals to the processor thereof. Here, the processor of the LTE user equipment controls the receiver to decode the PBCH using mask sequences corresponding to antenna counts {1, 2, 4} exemplified in Table 2 and can recognize the number of corresponding antennas through a specific mask sequence used to decode the PBCH. When a transmit antenna count field is added to MIB, the processor of the LTE user equipment can process a value set to this field as an error or ignore the value since it recognizes the field as a spare bit. On the other hand, the processor of the LTE-A user equipment can recognize the actual number of transmit antennas of the LTE-A system from the value set to the transmit antenna count field in the MIB.

Embodiment 2

New PBCH Configuration

Current MIB spare bits are limited to 10 bits. Since the size of MIB is restricted to a specific value, a case in which all system information about new technologies introduced to the LTE-A system cannot be included in the spare bits may occur.

Accordingly, embodiment 2 of the present invention allocates a new PBCH including new system information to one of downlink subframes rather than embedding the new system information in the MIB spare bits. The new PBCH can be embedded in one of $0^{th}$, fourth, fifth and ninth subframes in the case of FDD and embedded in one of $0^{th}$, first, fifth and sixth subframes in the case of TDD. A case in which the new PBCH is embedded in the fifth subframe is exemplified in the following description for convenience of explanation.

Figure 10:
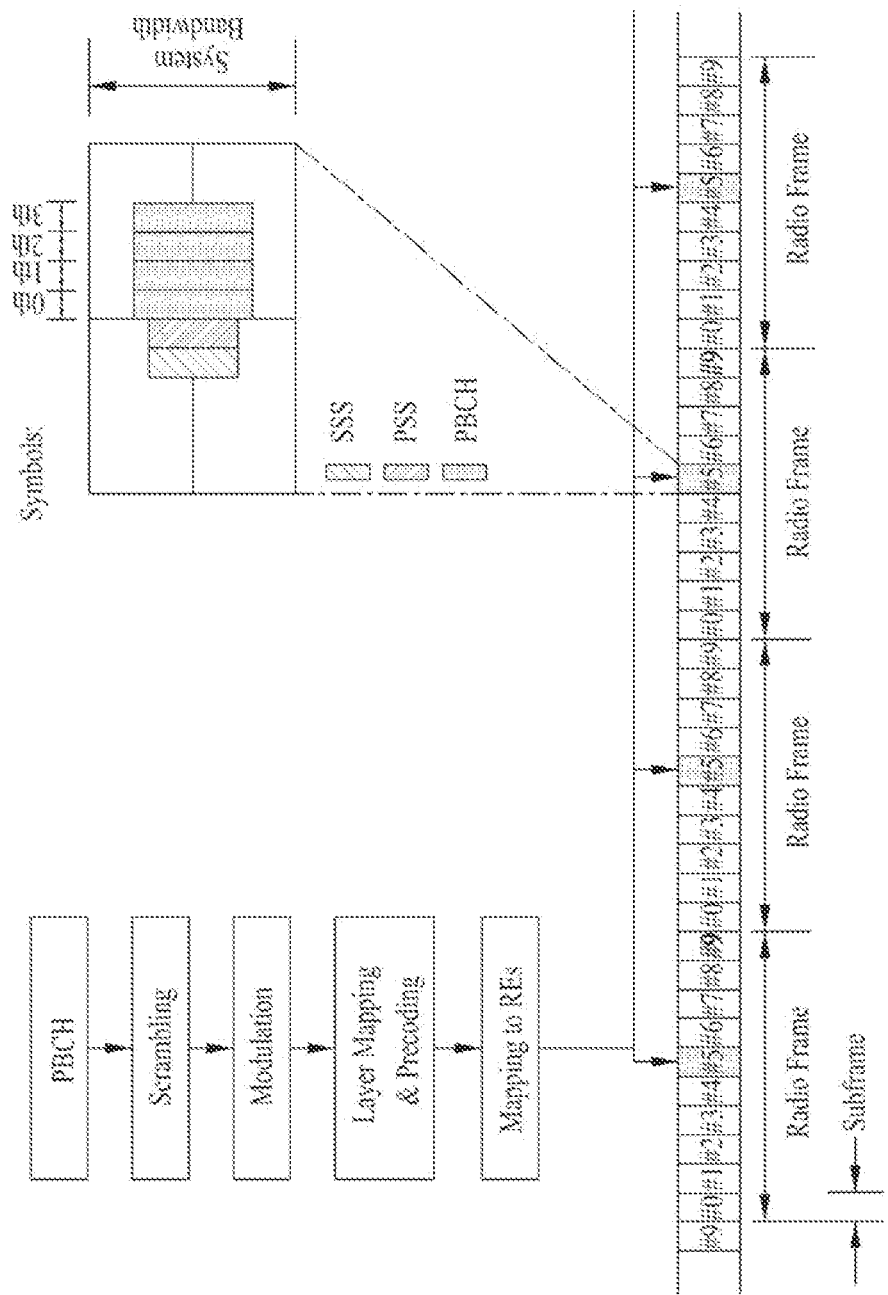
FIGS. 10 and 11 illustrate a method for configuring system information in a radio frame according to an embodiment of the present invention.
Figure 11:
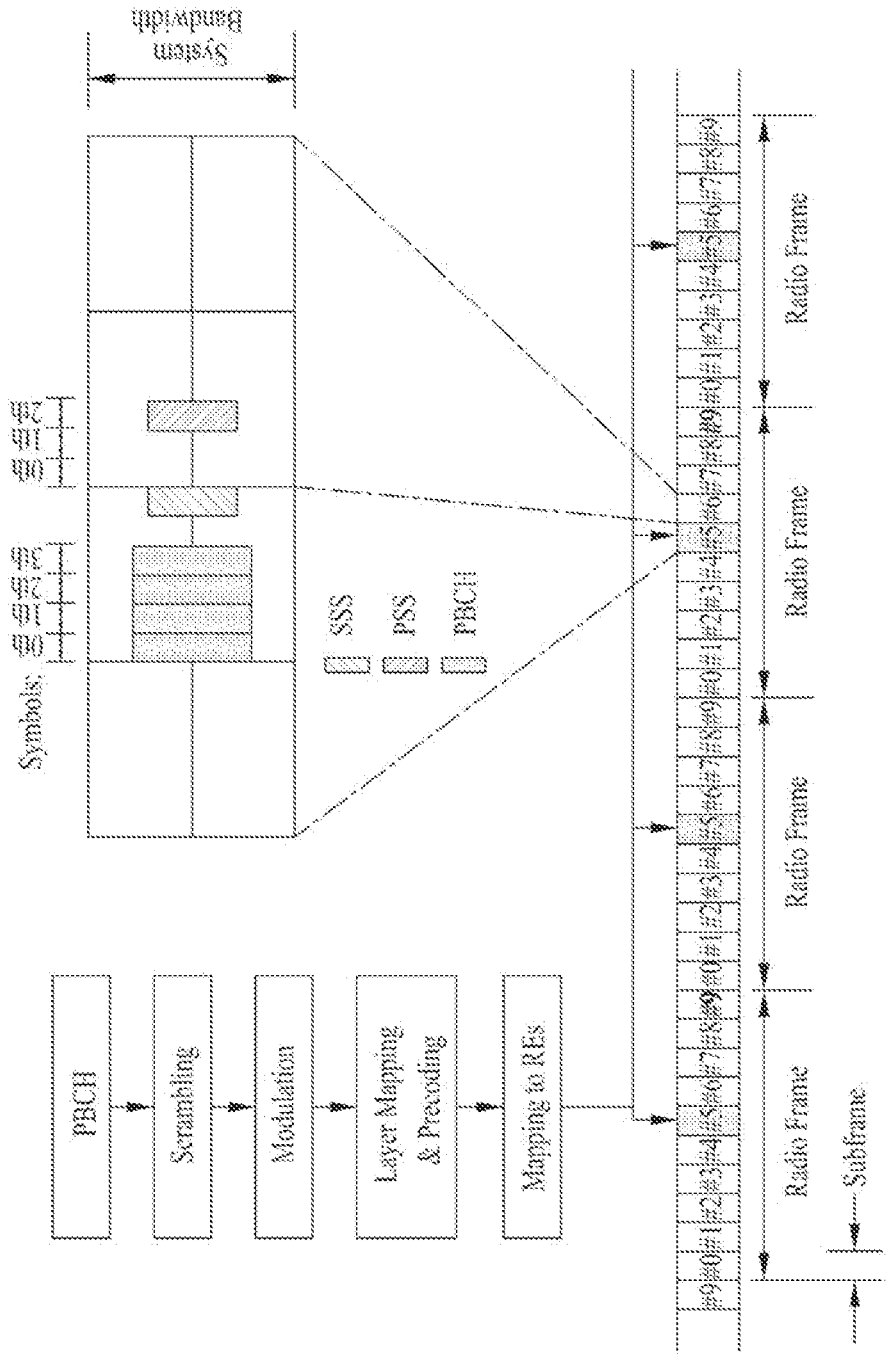

FIGS. 10 and 11 illustrate a method for configuring system information in a radio frame according to an embodiment of the present invention. Specifically, FIG. 10 shows an example of embedding the new PBCH in the fifth subframe of a FDD radio frame and FIG. 11 shows an example of embedding the new PBCH in the fifth subframe of a TDD radio frame.

Referring to FIGS. 10 and 11, a legacy PBCH is embedded in a legacy location of the $0^{th}$ subframe of the FDD radio frame or TDD radio frame. The new PBCH may be allocated to a resource element region to which a P-SCH, a S-SCH, the legacy PBCH, a reference signal, and SIB1 are not allocated from among resource regions of downlink subframes of the FDD radio frame or TDD radio frame. For example, if the new PBCH is allocated to the fifth subframe, the new PBCH can be allocated to first to fourth OFDM symbols of the rear slot of the fifth subframe of the FDD radio frame. For reference, when the new PBCH is allocated to a radio frame in this manner, it is advantageous that the fifth subframe to which the new PBCH is allocated has a configuration similar to the $0^{th}$ subframe to which the P-SCH, S-SCH, and legacy PBCH are allocated.

Examples of the new PBCH will be explained through implementation examples 2-1 and 2-3.

Implementation Example 2-1

A legacy PBCH and a new PBCH include information in the same format as the MIB represented in Table 1. The legacy PBCH may be masked by one of sequences represented in Table 2 and the new PBCH may be masked by one of newly defined sequences and embedded in a radio frame.

Tables 6, 7 and 8 show exemplary PBCH CRC mask sequences which can be used for the new PBCH. In Tables 6, 7 and 8, the number of transmit antenna ports and a mapping sequence of CRC mask sequences can be changed. In addition, while CRC masks are mapped in a case in which {1, 2, 4, 8} antenna ports are used in Table 6, 7 and 8, a CRC mask is defined for each of {1, 2, 3, 4, 5, 6, 7, 8} antenna ports when the {1, 2, 3, 4, 5, 6, 7, 8} antenna ports can be used in an 8Tx transmit antenna system.

TABLE 6

| Number of transmit antenna ports at eNode-B | PBCH CRC mask $<x_{ant.0}, x_{ant.1}, \ldots, x_{ant.15}>$ |
|---|---|
| 1 | <0, 0, 1, 1, 0, 0, 1, 1, 0, 0, 1, 1, 0, 0, 1, 1> |
| 2 | <1, 1, 0, 0, 1, 1, 0, 0, 1, 1, 0, 0, 1, 1, 0, 0> |
| 4 | <0, 0, 0, 0, 1, 1, 1, 1, 0, 0, 0, 0, 1, 1, 1, 1> |
| 8 | <1, 1, 1, 1, 0, 0, 0, 0, 1, 1, 1, 1, 0, 0, 0, 0> |

TABLE 7

| Number of transmit antenna ports at eNode-B | PBCH CRC mask $<x_{ant.0}, x_{ant.1}, \ldots, x_{ant.15}>$ |
|---|---|
| 1 | <0, 1, 1, 0, 0, 1, 1, 0, 0, 1, 1, 0, 0, 1, 1, 0> |
| 2 | <1, 0, 0, 1, 1, 0, 0, 1, 1, 0, 0, 1, 1, 0, 0, 1> |
| 4 | <0, 0, 1, 1, 0, 0, 1, 1, 0, 0, 1, 1, 0, 0, 1, 1> |
| 8 | <1, 1, 0, 0, 1, 1, 0, 0, 1, 1, 0, 0, 1, 1, 0, 0> |

TABLE 8

| Number of transmit antenna ports at eNode-B | PBCH CRC mask $<x_{ant.0}, x_{ant.1}, \ldots, x_{ant.15}>$ |
|---|---|
| 1 | <0, 1, 1, 0, 1, 1, 0, 1, 1, 0, 1, 1, 0, 1, 1, 0> |
| 2 | <1, 0, 0, 1, 0, 0, 1, 0, 0, 1, 0, 0, 1, 0, 0, 1> |
| 4 | <0, 1, 1, 1, 0, 1, 1, 1, 0, 1, 1, 1, 0, 1, 1, 1> |
| 8 | <1, 0, 1, 0, 1, 0, 1, 0, 1, 0, 1, 0, 1, 0, 1, 0> |

It is desirable that a CRC mask sequence of the new PBCH uses a sequence having a longest minimum length for each sequence except sequences defined in the LTE system.

The base station can transmit the radio frame including the legacy PBCH and the new PBCH to user equipment. In other words, the processor 400b of the base station may control the transmitter 100b to allocate a PBCH in a legacy form including a MIB in a legacy format to corresponding legacy resource elements in the radio frame and control the transmitter 100b to allocate a new PBCH to new resource elements (for example, first to fourth OFDM symbols of the rear slot of the fifth subframe) in the radio frame. The resource element mapper 305 of the transmitter 100b respectively allocates the legacy PBCH and the new PBCH to the corresponding resource elements under the control of the processor 100b of the base station.

Since the legacy PBCH is allocated to legacy resource elements in the $0^{th}$ subframe and transmitted, LTE user equipment may receive the radio frame according to implementation example 2-1 and acquire the legacy PBCH from the legacy PBCH location of the radio frame. That is, the processor of the LTE user equipment controls the receiver thereof to decode the legacy PBCH allocated to the $0^{th}$ subframe of the radio frame using mask sequences exemplified in Table 2 and determines the number of antennas, which corresponds to a specific mask sequence that has been successfully decoded, as the number of transmit antennas of the corresponding base station. In addition, the processor of the LTE user equipment can confirm a downlink bandwidth, a system frame number and PHICH configuration information from the MIB included in the legacy PBCH.

If the new PBCH is allocated to the fifth subframe, as shown in FIGS. 10 and 11, the processor of LTE-A user equipment may control the receiver thereof to decode the new PBCH allocated to the fifth subframe using a newly defined mask sequence for each transmit antenna count and determine the number of antennas, which corresponds to a specific mask sequence that has been successfully decoded, as the number of transmit antennas of the corresponding base station. In addition, the processor of the LTE-A user equipment can confirm a downlink bandwidth, a system frame number and PHICH configuration information from the MIB included in the legacy PBCH.

For reference, the resource elements to which the new PBCH is allocated correspond to a region which was used as resource elements to which user data and control information are allocated, and thus the legacy user equipment will recognize the new PBCH as normal downlink data instead of recognizing the new PBCH as a broadcasting signal acquired during cell search. Otherwise, the legacy user equipment cannot decode the new PBCH since it is not aware of the new CRC mask sequence used for the new PBCH, and thus the new PBCH may be processed as an error. This can be applied to the following implementation example.

Implementation Example 2-2

The legacy PBCH includes the legacy MIB information shown in Table 1 and the new PBCH includes new system information, and they can be embedded in corresponding resource elements in the radio frame.

As technology which was not used in the LTE system is introduced to the LTE-A system, the LTE-A user equipment needs to be notified of more system information from the base station, compared to the LTE user equipment. Accordingly, implementation example 2-2 of the present invention transmits system information specified according to the technology introduced to the new system to user equipment through the new PBCH.

New system information that can be embedded in the new PBCH may include information about frequency aggregation, CoMP, relay, new antenna configuration, etc. The LTE-A user equipment may be implicitly informed of the new antenna configuration information through CRC mask sequences of the new PBCH, as described in implementation example 2-1.

The base station may allocate the PBCH including the legacy MIB to first to fourth OFDM symbols of the first slot of the radio frame, allocate the PBCH including the system information to a subframe of which usage is not specified from among downlink subframes, for example, the fifth subframe, and transmit them to user equipment. That is, the processor 400b of the base station can control the transmitter 100b to allocate the PBCH including the MIB of the legacy format to the first to fourth OFDM symbols of the first slot of the radio frame and control the transmitter 100b to allocate the new PBCH to a new resource element in the radio frame, for example, first to fourth OFDM symbols of the rear slot of the fifth subframe. The resource element mapper 305 of the transmitter 100b respectively allocates the legacy PBCH and the new PBCH to corresponding resource elements under the control of the processor 400b of the base station.

The LTE-A user equipment according to implementation example 2-2 can acquire the legacy PBCH from the first slot of the $0^{th}$ subframe of the received radio frame as does the LTE user equipment. However, the LTE-A user equipment further acquires the new system information through the new PBCH, distinguished from the LTE user equipment. For example, if the new PBCH can implicitly represent the number of antennas through a CRC mask sequence, the LTE-A user equipment can confirm the number of transmit antennas through the CRC mask sequence of the new PBCH and check a message in the new PBCH to confirm the new system information which is not included in the legacy PBCH.

In other words, the processor of the LTE user equipment can control the receiver to decode the legacy PBCH allocated to the $0^{th}$ subframe of the radio frame using mask sequences shown in Table 2, determine the number of antennas, which corresponds to a successfully decoded specific mask sequence, as the number of transmit antennas of the base station, and confirm a downlink bandwidth, a system frame number and PHICH configuration information from the MIB included in the decoded PBCH. The processor of the LTE-A user equipment can confirm the downlink bandwidth, system frame number and PHICH configuration information from the MIB included in the legacy PBCH, as does the processor of the LTE user equipment. However, the processor of the LTE-A user equipment further acquires new system information, for example, new antenna configuration information, from the new PBCH.

Consequently, according to implementation example 2-2, the LTE-A user equipment acquires legacy system information from the legacy PBCH and obtain system information newly introduced according to the new system from the new PBCH while the LTE user equipment confirms the number of transmit antennas, downlink bandwidth, system frame number and PHICH configuration information through the legacy PBCH.

Implementation Example 2-3

A part of the spare bits of the legacy MIB may be used to indicate whether or not a new PBCH is present.

TABLE 9

```
-- ASN1START
MasterInformationBlock ::=SEQUENCE {
    dl-Bandwidth      ENUMERATED {n6,n15,n25,n75,n100,spare2,
                      spare1}.
    phich-Configuration   PHICH-Configuration,
    systemFrameNumber BIT STRING (SIZE(8)),
    newPBCH           BIT (SIZE(1)),
    ...
}
-- ASN1STOP
```

When new system information that needs to be confirmed by the LTE-A user equipment is present, the base station can inform the LTE-A user equipment of the presence of the new PBCH by setting 'newPBCH' field to '1', for example. When 'newPBCH' field is set to '1', the LTE-A user equipment can confirm the new PBCH from a corresponding resource element, for example, the fifth subframe so as to acquire the new system information newly introduced to the LTE-A system. For reference, since the LTE user equipment recognizes 'newPBCH' field as spare bits only, the LTE user equipment will not recognize the value of 'newPBCH' field or will process it as an error even if 'newPBCH' filed is set to '1'.

If there is no new system information to be transmitted from the base station to user equipment, the base station may set 'newPBCH' field to '0' and transmit radio frames configured according to the LTE system to user equipment. In this case, the LTE-A user equipment can recognize that received radio frames do not include LTE-A specific system information by confirming that 'newPBCH' field is set to '0'. Accordingly, the LTE-A user equipment acquires the number of antennas, a downlink bandwidth, a system frame number, and PHICH configuration information from the legacy PBCH only as does the LTE user equipment.

Referring to FIGS. 3 and 4, the processor 400b of the base station can set 'newPBCH' depending on whether or not new system information to be transmitted is present. When the new system information to be transmitted, for example, antenna configuration information about 8Tx downlink antenna ports is present, the processor 400b of the base station sets 'newPBCH' of MIB to '1', controls the resource element mapper 305 to allocate a PBCH including a MIB to the $0^{th}$ subframe of a legacy 10 ms radio frame, and controls the resource element mapper 305 to allocate a new PBCH configured to signal explicitly or implicitly the new system information to one of downlink subframes, for example, the fifth subframe. The processor of the LTE user equipment and the processor of the LTE-A user equipment acquire necessary information from the legacy PBCH. The LTE-A user equipment further acquires the new system information from a resource element region corresponding to the new PBCH, for example, first to fourth symbols of the rear slot of the fifth subframe, since 'newPBCH' field included in the MIB is set to '1'.

For reference, new antenna configuration information may be implicitly transmitted to user equipment through CRC mask sequences of the new PBCH, as described in implementation examples 2-1 and 2-2.

If new system information to be transmitted is not present, the processor 400b of the base station may control the transmitter 100b to transmit radio frames in a legacy form to user equipment through component carriers. In this case, the processors of the LTE user equipment and LTE-A user equipment confirm the legacy PBCH to acquire the number of transmit antennas, a downlink bandwidth, a system frame number and PHICH configuration information.

In implementation examples 2-1, 2-2 and 2-3, CRC mask sequences of the legacy PBCH differ from CRC mask sequences of the new PBCH such that the legacy user equipment does not confuse the legacy PBCH with the new PBCH. However, besides the method of masking the new PBCH using CRC mask sequences different from the legacy CRC mask sequences, a method of preventing the legacy user equipment from recognizing the new PBCH using a scrambling or encoding structure different from that of the legacy PBCH can be used. Since the legacy user equipment cannot decode or demodulate the new PBCH scrambled or encoded using the scrambling or encoding structure different from that of the legacy PBCH, the possibility that the legacy user equipment confuses the new PBCH with the legacy PBCH can be reduced.

Embodiment 3

New System Information is Embedded in SIB

Embodiment 3 of the present invention embeds new system information in one of previously defined SIBs and transmits the SIB including the new system information to user equipment, or defines a new SIB for the new system information to transmit the new system information to the user equipment. System information that cannot be transmitted through a legacy broadcast channel (PBCH) can be transmitted in a SIB message form to user equipment through a PDSCH (Physical Downlink Shared Channel). The SIB including the new system information can be allocated to a downlink subframe other than a $0^{th}$ subframe that transmits a PBCH from among downlink subframes in a 10 ms radio frame. For example, the SIB can be allocated to one of fourth, fifth and ninth subframes in the case of a FDD radio frame, and allocated to first, fifth and sixth subframe in the case of a TDD radio frame.

Embodiment 3 of the present invention to transmit new system information through a SIB message will now be explained with reference to implementation examples 3-1 to 3-4. While the number of transmit antennas of the LTE-A system is transmitted as the new system information in the following description for convenience of explanation, it is possible to configure a SIB with system information related to frequency aggregation, CoMP and relay and allocate the SIB to a radio frame, as described above.

Implementation Example 3-1

New System Information is Embedded in Legacy SIB

SystemInformationBlockType1 (SIB1) includes information about determining whether or not user equipment is allowed to access a cell and defines scheduling of other system information. In Table 10, AdvancedAccessInfo represents system information newly defined in LTE-A. For example, antenna configuration newly defined in the LTE-A system, that is, transmit antenna configuration that needs to be confirmed by the LTE-A user equipment can be included in SIB1. While Table 10 shows that new system information is included in SIB1, the new system information may be included in other SIBs according to properties of parameters constructing the new system information.

When the new system information to be transmitted is present, the base station embeds the new system information in one of previously defined SIBs and allocates a PDSCH that will transmit the SIB to one of downlink subframes of a radio frame. Here, the processor 400b of the base station can control the resource element mapper 305 to allocate the SIB including the system information to a downlink subframe other than the $0^{th}$ subframe to which a MIB is allocated. If the new system information is allocated to a SIB instead of SIB1, the processor 400b can control the resource element mapper 305 to allocate the SIB including the new system information to a downlink subframe other than a subframe to which the SIB1 is allocated.

When the SIB includes the new system information, the LTE user equipment recognizes only previously defined information in the SIB correctly and performs cell search and system configuration. However, the LTE user equipment cannot recognize the newly embedded new system information or may recognize it as an error.

On the other hand, the LTE-A user equipment can recognize the new system information and SIBs including the new system information, and thus it can acquire the new system information included in the SIBs, such as information about frequency aggregation, CoMP, relay and antenna configuration.

For reference, a SIB in which new system information will be embedded may not be determined in advance and the new system information may be included in an appropriate SIB depending on the circumstances. In this case, the LTE-A user

TABLE 10

```
-- ASN1START
SystemInformationBlockType1 ::= SEQUENCE {
    CellAccessRelatedInfor          SEQUENCE {
        Plmn-IdentityList               PLMN-IdentityList,
        trackingAreaCode                TrackingAreaCode,
        cellIdentity                    CellIdentity,
        cellBarred                              ENUMERATED {barred,
notBarred},
        intraFreqReselection                ENUMERATED {allowed,
nonAllowed},
        csg-Indication                  BOOLEAN,
        csg-Identity                    CSG-Identity-r9 OPTIONAL --Need
OR
    }
    ...
}
AdvancedAcessInfo ::= SEQUENCE {
    ...
    AntennaConfiguration            ANTENNA-Configuration,
    ...
}
...
-- ASN1STOP
``` equipment searches SIBs transmitted from the base station to confirm the new system information.

Implementation Example 3-2

New System Information is Embedded in New SIB

TABLE 11

```
-- ASN1START
SystemInformationBlockTypeX ::= SEQUENCE {
    ...
    AdvancedAccessInfo         SEQUENCE {
        ...
        AntennaConfiguration       ANTENNA-Configuration,
        ...
    }
    ...
}
-- ASN1STOP
```

SystemInformationBlockTypeX (SIB X) represents a system information block newly defined to signal system information newly defined in LTE-A, that it, new system information, to user equipment.

The base station embeds the new system information to be transmitted to user equipment in SIB X and allocates a PDSCH which will carry the SIB X to a part of a radio frame. Here, the processor 400*b* of the base station can control the resource element mapper 305 to allocate the PDSCH to a downlink subframe of the radio frame other than a $0^{th}$ subframe to which a MIB is allocated and a subframe to which SIB1 is allocated.

The LTE user equipment may receive the radio frame and acquire required system information from the MIB included in the radio frame and SIBs defined in the LTE system from among SIBs in the radio frame. The LTE-A user equipment can confirm SIB X newly introduced to the LTE-A system as well as the MIB and SIBs defined in the LTE system so as to acquire legacy system information and the new system information.

Implementation Example 3-3

Information about Whether or not New System Information is Present is Embedded in MIB In addition to the new system information included in the SIB in implementation examples 3-1 or 3-2, the base station may signal whether or not the SIB including the new system information is present to the LTE-A user equipment using a part of the spare bits of the MIB.

TABLE 12

```
-- ASN1START
MasterInformationBlock ::=SEQUENCE {
    dl-Bandwidth       ENUMERATED {n6,n15,n25,n75,n100,spare2,
                       spare1},
    phich-Configuration  PHICH-Configuration,
    systemFrameNumber    BIT STRING (SIZE(8)),
    advancedSystemInfo   BIT (SIZE(1)),
    ...
}
-- ASN1STOP
```

If a new system information block or new system information field that needs to be confirmed by the LTE-A user equipment is present in a legacy SIB, the base station can configure such that a part of the spare bits represents whether or not new system information is present. In addition, information representing a system version corresponding to LTE-A system may be added to the part of the spare bits. For example, the base station can configure 'advancedSystemInfo' field and set this field to '1' to inform the LTE-A user equipment that the SIB including the new system information is present. In this case, the LTE-A user equipment according to implementation example 3-1 can confirm at least one of legacy SIBS to acquire the new system information, and the LTE-A user equipment according to implementation 3-2 can confirm the newly defined SIB X to acquire the new system information.

The processor of the LTE-A user equipment is configured to confirm 'advancedSystemInfo' to check whether or not the SIB including the new system information is present and can search downlink subframes for the SIB when the SIB is present. The SIB including the new system information may be transmitted through a specific downlink subframe. In this case, the processor of the LTE-A user equipment is configured to confirm the specific downlink subframe to acquire the new system information. For reference, if 'advancedSystemInfo' field is set to '1', the LTE user equipment recognizes 'advancedSystemInfo' field as a spare bit only, and thus it cannot recognize the field or processes it as an error even if the field is set to '1'.

If new system information to be transmitted to user equipment is not present, the base station can set 'advancedSystemInfo' field to '0' and transmit radio frames configured according to the LTE system to user equipment. In this case, the LTE-A user equipment can recognize that received radio frames do not include LTE-A specific system information by confirming that 'advancedSystemInfo' field is set to '0'. Accordingly, the LTE-A user equipment can acquire system information that is not included in a legacy PBCH from SIBs in a legacy format while obtaining the number of antennas, a downlink bandwidth, a system frame number and PHICH configuration information from the legacy PBCH as does the LTE user equipment.

Referring to FIGS. 3 and 4, the processor 400*b* of the base station can set 'advancedSystemInfo' field depending on whether or not new system information to be transmitted is present. If the new system information to be transmitted, for example, antenna configuration information about 8Tx downlink antenna ports, is present, the processor 400*b* of the base station sets 'advancedSystemInfo' field to '1' of the MIB, controls the resource element mapper 305 to allocate a PBCH including the MIB to a $0^{th}$ subframe of a legacy 10 ms radio frame, and controls the resource element mapper 305 to allocate the SIB including the new system information to a subframe at a specific transmission interval of the SIB.

The processor of the LTE user equipment and the processor of the LTE-A user equipment can acquire the number of transport antennas, a downlink bandwidth, a system frame number, and PHICH configuration information according to the LTE system from the MIB transmitted through the PBCH in the $0^{th}$ subframe of the 10 ms radio frame. The processor of the LTE-A user equipment can further confirm whether or not the SIB including the new system information is present by checking configuration of a part of spare bits in addition to information included in the MIB. If a bit of the spare bits of the MIB, which indicates whether or not the SIB including the new system information is present, for example, 'advancedSystemInfo' field, is set to '1', the processor of the LTE-A user equipment can search SIBs allocated to other subframes to acquire the new system information.

If the new system to be transmitted is not present, the processor 400*b* of the base station can control the transmitter 100b to transmit radio frames in a legacy form to user equipment through component carriers. In this case, the processors of the LTE user equipment and LTE-A user equipment confirm a legacy PBCH and a legacy SIB to acquire required system information.

Implementation Example 3-4

Information Representing Whether or not New System Information is Present is Embedded in SIB1

TABLE 13

```
-- ASN1START
SystemInformationBlockType1 ::= SEQUENCE {
CellAccessRelatedInfor    SEQUENCE {
    Plmn-IdentityList       PLMN-IdentityList,
    trackingAreaCode        TrackingAreaCode,
    cellIdentity            CellIdentity,
    cellBarred              ENUMERATED {barred, notBarred},
    intraFreqReselection    ENUMERATED {allowed, nonAllowed},
    csg-Indication          BOOLEAN,
    csg-Identity            CSG-Identity-r9 OPTIONAL --Need OR
}
...
SchedulingInfoList ::= SEQUENCE (SIZE (1..maxSI-MESSAGE)) OF
SchedulingInfo
SchedulkingInfo ::= SEQUENCE {
    Si-Periodicity          ENUMERATED {
                            rf8,rf16,rf32,rf64,rf128,rf256,rf512
    sib-MappingInfo         SIB-MappingInfo
}
SIB-MappingInfo ::= SEQUENCE (SIZE (0..maxSIB-1)) OF SIB-TYPE
SIB-TYPE ::=                ENUMERATED {
                            sibType3, sibType4, sibType5,
                    sibType6,  sibType7,  sibType8,  ..,
                            sibTypeX,..., spare2, spare1, ..}
-- ASN1STOP
```

If SIB X including new system information that needs to be confirmed by the LTE-A user equipment is present, the base station can embeds information representing the presence of SIB X in the legacy SIB1. In this case, the LTE-A user equipment can check information of the SIB1 to confirm the presence of the SIB X and acquire the new system information from the SIB X.

The processor of the LTE-A user equipment is configured to check a SIB X related field in the SIB1 to confirm the presence of the SIB X including the new system information and, when the presence of the SIB X is confirmed, can search downlink subframes for the SIB X. The SIB X including the new system information may be transmitted through a specific downlink subframe. In this case, the processor of the LTE-A user equipment is configured to acquire the new system information by confirming the specific downlink subframe. For reference, user equipment implemented according to a legacy system recognizes a corresponding field as a spare field only, and thus even if the corresponding field includes information about the SIB X, the user equipment cannot recognize it or processes the field as an error.

If new system information to be transmitted to user equipment is not present, the base station may generate SIB1 in a legacy form which does not include information about the SIB X and transmit the SIB1 to user equipment through radio frames. In this case, the LTE-A user equipment acquires system information of the LTE system from the PBCH and legacy SIBs as does the LTE user equipment.

Referring to FIGS. 3 and 4, the processor 400b of the base station can generate SIB1 depending on whether or not new system information to be transmitted is present. If the new system information to be transmitted is present, the base station embeds information related to the SIB X in a SIB X related field of the SIB1 and controls the transmitter 100b to signal the SIB1 to user equipment at an interval of 80 ms. In addition, the base station controls the transmitter 100b to signal the SIB X including the new system information to user equipment at a predetermined interval. The signaling period of the SIB X, that is, scheduling information, may be included in the SIB X related field of the SIB1 and transmitted to user equipment.

The processor of the LTE user equipment and the processor of the LTE-A user equipment can acquire the number of transmit antennas and a downlink bandwidth according to the LTE system, a system frame number, and PHICH configuration information from a MIB transmitted through a PBCH in a $0^{th}$ subframe of a 10 ms radio frame. In addition, the processor of the LTE user equipment and the processor of the LTE-A user equipment can acquire system information of the LTE system from the legacy information of the SIB1 and other legacy SIBs. The processor of the LTE-A user equipment can further confirm the presence of the SIB X and/or scheduling information by confirming the SIB X related field in addition to information included in the legacy SIB1, distinguished from the LTE user equipment. If the SIB X related field is present in the SIB1, the LTE-A user equipment can be aware of a subframe including the SIB X with reference to SIB X scheduling information in the SIB X related field and confirm the SIB X from the subframe to acquire LTE-A specific new system information.

If the new system information to be transmitted is not present, the processor 400b of the base station can control the transmitter 100b to transmit radio frames in the legacy form to user equipment through component carriers. In this case, the processors of the LTE user equipment and the LTE-A user equipment acquire required system information by confirming the legacy PBCH and legacy SIB.

Figure 12:
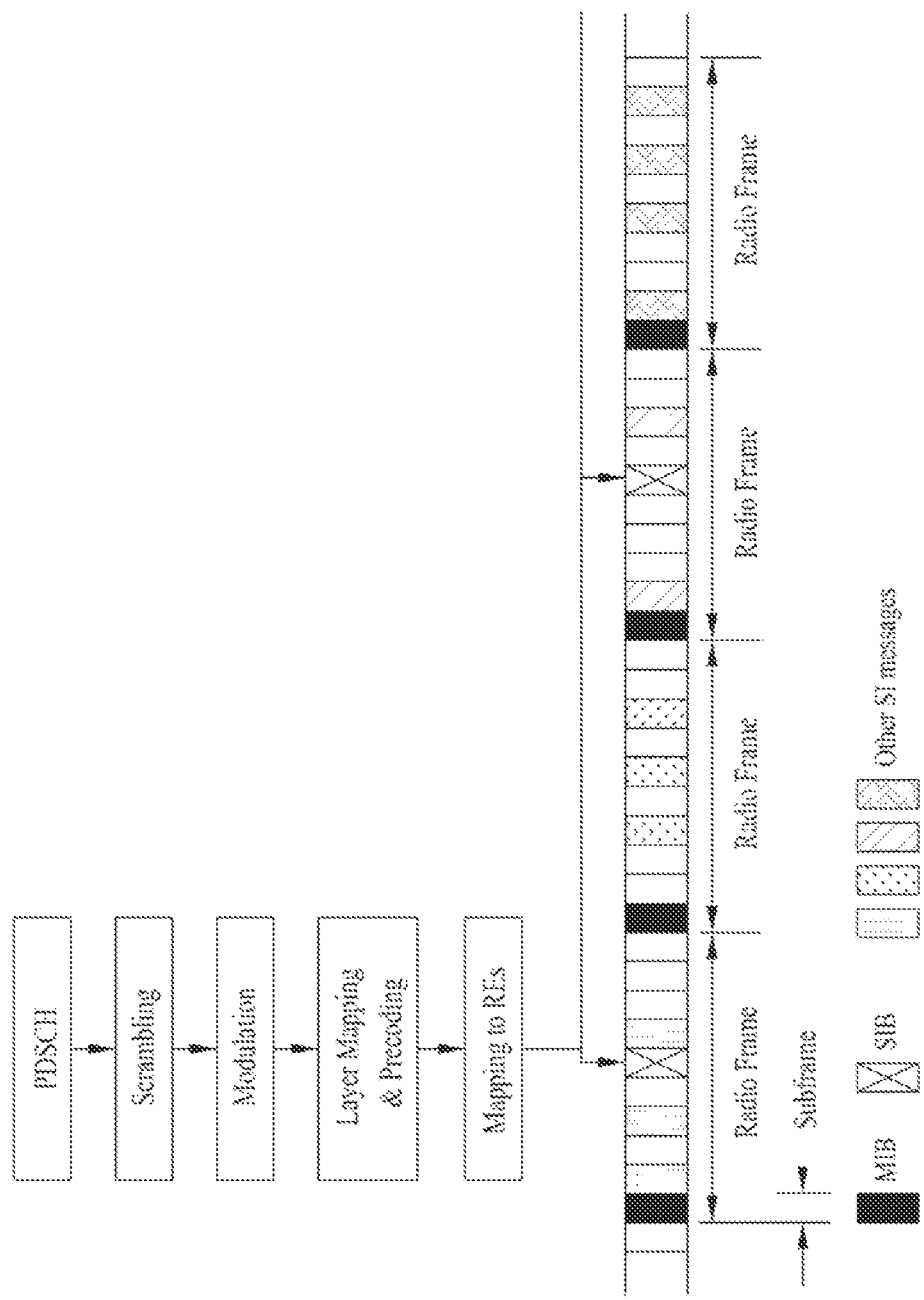
FIG. 12 illustrates a method for configuring system information in a radio frame according to another embodiment of the present invention.

FIG. 12 illustrates a method for configuring system information in a radio frame according to another embodiment of the present invention. While the embodiment shown in FIG. 12 describes the case in which new system information is included in SIB1 in the implementation examples of embodiment 3 of the present invention, even if new system information is included in other SIBs, the SIBs can be allocated to a radio frame in the same manner. In the case of implementation example 3-3, a PBCH including a MIB having information representing whether or not new system information is present is allocated to a $0^{th}$ subframe of a 10 ms radio frame and transmitted with the new system information to user equipment, as described above with reference to FIG. 6. For reference, signaling period information for each SIB, that is, scheduling information may be included in SIB1 and transmitted to user equipment at an interval of 20 ms. Here, the base station may allocate a SIB including the system information, for example, SIB1, to a downlink subframe other than the $0^{th}$ subframe to which the MIB is allocated and transmit it to the user equipment. If the new system information is allocated to a SIB instead of SIB1, the SIB may be allocated to a subframe other than a subframe to which the SIB1 is allocated.

Referring to FIGS. 3 and 4, if new system information to be transmitted is present, the processor 400b of the base station embeds the new system information in one of previously defined SIBs. In addition, the processor 400b of the base station controls the scrambler 301 to scramble a PDSCH that will transmit the SIB including the new system information and controls the modulation mapper 302 to modulate the scrambled PDSCH into complex symbols. The layer mapper 303 maps the complex symbols to one or more transport layers and the precoder 304 multiplies the complex symbols of the transport layers by a precoding matrix selected depending on channel state to output complex symbols for respective antennas under the control of the processor 400b of the base station. The processor 400b of the base station controls the resource element mapper 305 to map the complex symbols for respective antennas to time-frequency resource elements to be used for transmission. The OFDMA generator 306 converts the complex symbols for respective antennas, which are mapped to the time-frequency resource elements, into OFDM signals for respective antenna ports and transmits the OFDM signals to the respective antenna ports under the control of the processor 400b of the base station.

The processor 400b of the base station can configure SIB1 such that the SIB 1 includes signaling period information of other SIBs instead of SIB1, that is, scheduling information, and control the resource element mapper 305 to transmit the SIB1 to user equipment at an interval of 20 ms. Here, the processor 400b of the base station can control the resource element mapper 305 to allocate the SIB including the system information, for example, SIB1, to a downlink subframe other than the $0^{th}$ subframe to which MIB is allocated. If the new system information is allocated to a SIB instead of SIB1, the processor 400b may control the resource element mapper 305 to allocate the SIB to a subframe other than a subframe to which the SIB1 is allocated.

The receiver of the LTE user equipment decodes and demodulates an OFDM symbol signal received through an antenna and transmits the decoded and demodulated signal to the processor thereof. The processor of the LTE user equipment can confirm system information that is not transmitted through a PBCH from the legacy information in the legacy SIB.

The receiver of the LTE-A user equipment decodes and demodulates an OFDM symbol signal received through an antenna and transmits the decoded and demodulated signal to the processor thereof. The processor of the LTE-A user equipment can acquire LTE system information from the legacy MIB and SIB information and obtain new system information from at least one of SIBs.

The radio frame according to the above-mentioned embodiments of the present invention is transmitted to user equipment through at least one component carrier. Distinguished from the LTE system using a single uplink/downlink bandwidth, the LTE-A system employs carrier aggregation or bandwidth aggregation which aggregates a plurality of uplink/downlink frequency blocks to use a wider uplink/downlink bandwidth in order to use a wider frequency band.

Figure 13:
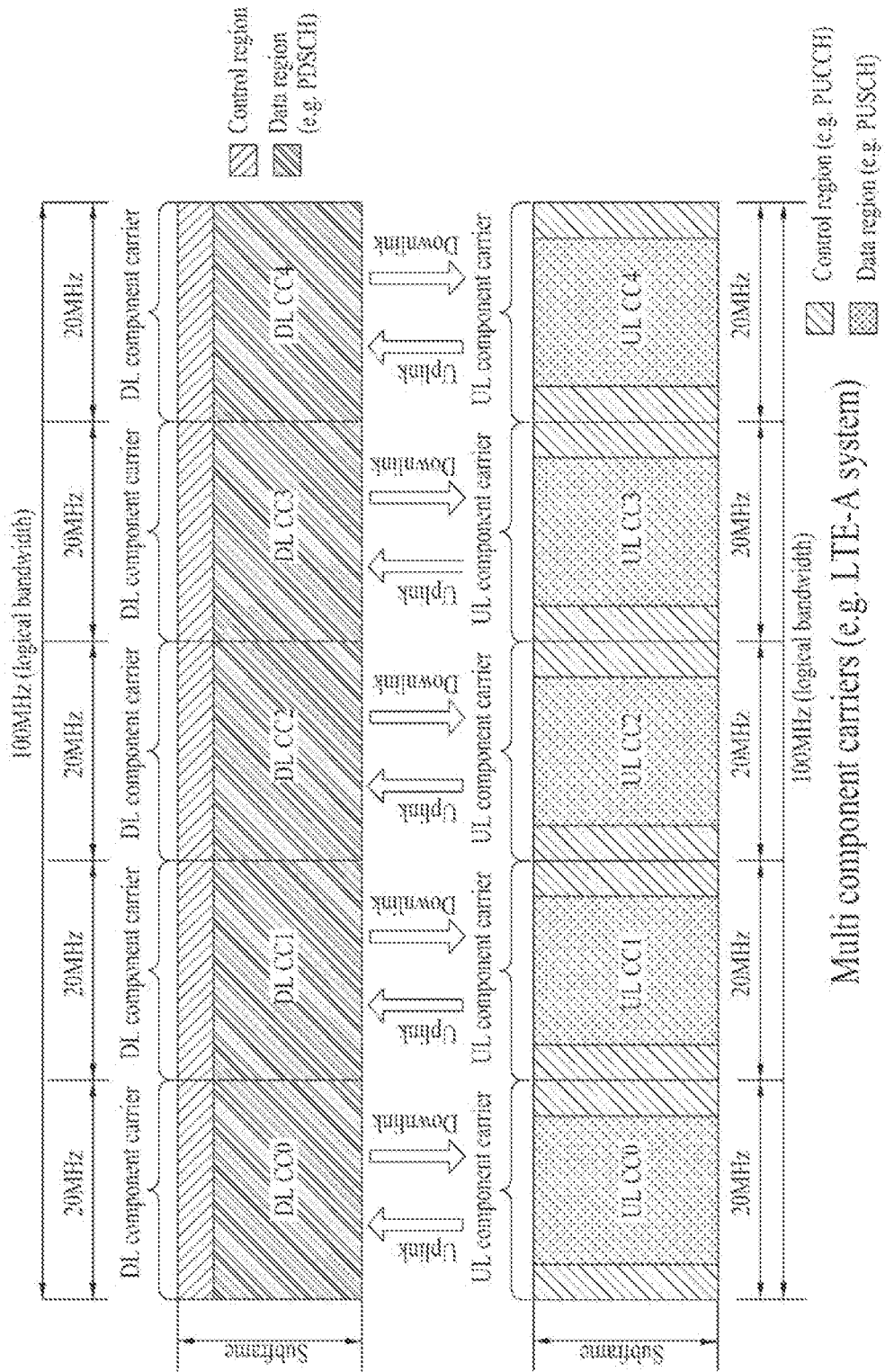
FIG. 13 illustrates a radio communication system supporting frequency aggregation.

FIG. 13 illustrates a radio communication system supporting frequency aggregation.

In the specification, a component carrier may mean a frequency block for carrier aggregation or a center carrier of a frequency block, which are used being mixed with each other.

Referring to FIG. 13, five 20 MHz CCs may be aggregated to support a bandwidth of 100 MHz in each of an uplink and downlink. The CCs may be contiguous or not in the frequency domain. FIG. 13 shows a case in which uplink component carriers and downlink component carriers have the same bandwidth and are symmetrical for convenience of explanation. However, the bandwidths of the component carriers can be independently determined. For example, the bandwidths of the uplink component carriers can be configured as 5 MHz ($A_{UL}$)+20 MHz ($B_{UL}$)+20 MHz ($C_{UL}$)+20 MHz ($D_{UL}$)+5 MHz ($E_{UL}$). In addition, asymmetrical carrier aggregation in which the number of uplink component carriers differs from the number of downlink component carriers can be performed.

At least one of the component carriers shown in FIG. 13 can be used to transmit radio frames according to the embodiments of the present invention. Some of the component carriers shown in FIG. 13 may be used to transmit radio frames configured according to the LTE system and some of the component carriers may be used to transmit radio frames configured according to the LTE-A system. In other words, the transmitter 100b of the base station can aggregate a component, carrier transmitting a radio frame (referred to as a LTE radio frame hereinafter) including LTE system information only and a component carrier transmitting a radio frame to which the LTE system information and LTE-A system information are allocated according to one of the embodiments of the present invention and transmit the aggregated component carriers with component carriers to user equipment.

Figure 14:
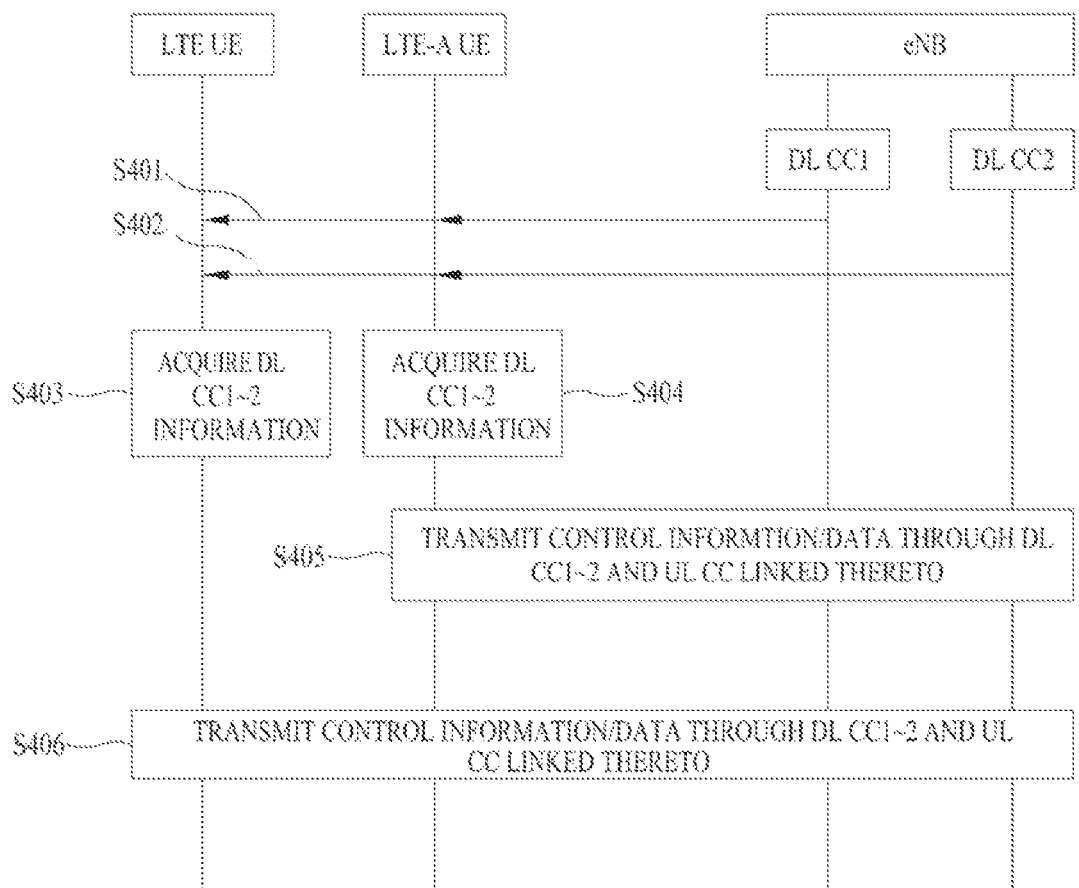
FIG. 14 illustrates radio communication using component carriers carrying radio frames configured according to embodiments of the present invention.

FIG. 14 illustrates radio communication using a component carrier carrying a radio frame configured according to embodiments of the present invention.

Referring to FIG. 14, if the LTE system and LTE-A system coexist, user equipment may receive a component carrier DL CC1 including LTE system information only (S401) or receive a component carrier DL CC2 including the LTE system information and LTE-A system information (S402).

In accordance with the embodiments of the present invention, the LTE user equipment may acquire the LTE system information from resource elements to which the corresponding system information of DL CC2 as well as DL CC1 is allocated (S403). That is, the LTE user equipment can transmit and receive control information and/or data through UL CCs linked to DL CC1 and DL CC2 even when it receives DL CC2 in addition to DL CC1 (S406).

The LTE-A user equipment can acquire the LTE system information from DL CC1 (S404) and operate being adapted for the LTE system on the basis of the LTE system information. For example, the LTE-A user equipment can transmit and receive control information and/or data through the UL CC linked to DL CC1 (S405).

In addition, the LTE-A user equipment can acquire the LTE-A system information allocated to a radio frame in DL CC2 when receiving DL CC2 (S404) and operate being adapted for the LTE-A system on the basis of the LTE-A system information. For example, the LTE-A user equipment can transmit and receive control information and/or data through the UL CC linked to DL CC2.

Therefore, the embodiments of the present invention can support forward compatibility and backward compatibility for user equipment in the LTE-A system.

Although the preferred embodiments of the present invention have been disclosed for illustrative purpose, those skilled in the art will appreciate that various modifications, additions and substitutions are possible, without departing from the scope and spirit of the invention as disclosed in the accompanying claims. Accordingly, the scope of the present invention should not be limited to the description of the embodiment, but defined by the accompanying claims and equivalents thereof.

INDUSTRIAL APPLICABILITY

The present invention relates to a radio communication system. Specifically, the present invention can be used for a method for configuring carriers accessible by both legacy user equipment and new user equipment and an apparatus for the method.

The invention claimed is:

1. A method for transmitting system information from a base station that supports a legacy system and an improved system having one or more functions added to the legacy system, the method comprising:
   transmitting a first broadcast channel, containing system information for supporting a user equipment for the legacy system, in a predetermined number of symbols that follow a synchronization channel in a first subframe of a radio frame containing a plurality of subframes; and
   transmitting additional system information for supporting a user equipment for the improved system in a second subframe, other than the first subframe, from among the plurality of subframes,
   wherein: the additional system information is contained in a second broadcast channel that is different from the first broadcast channel and transmitted in the second subframe; and the second broadcast channel is masked with a Cyclic Redundancy Check (CRC) that is different from a CRC applied to the first broadcast channel.

2. The method according to claim 1, wherein a master information block in the first broadcast channel contains information that indicates presence of the second broadcast channel.

3. The method according to claim 1, wherein: the plurality of subframes comprise ten subframes including subframe #0, which is a $0^{th}$ subframe, to subframe #9, which is a ninth subframe; the first subframe corresponds to subframe #0; and the second subframe corresponds to subframe #4, #5, or #9.

4. The method according to claim 1, wherein: the plurality of subframes comprise ten subframes including subframe #0, which is a $0^{th}$ subframe, to subframe #9, which is a ninth subframe;
   each of the ten subframes includes two slots;
   the first subframe corresponds to subframe #0;
   the second subframe corresponds to subframe #5;
   and the predetermined number of symbols correspond to four leading symbols of a rear slot among two slots included in subframe #5.

5. The method according to claim 1, wherein the additional system information is contained in a system information block.

6. The method according to claim 5, wherein a master information block in the first broadcast channel contains information that indicates presence of the additional system information.

7. The method according to claim 5, wherein: the plurality of subframes comprise ten subframes including subframe #0, which is a $0^{th}$ subframe, to subframe #9, which is a ninth subframe;
   the first subframe corresponds to subframe #0; and
   the second subframe corresponds to one of the ten subframes other than subframe #0.

8. The method according to claim 5, wherein the system information block corresponds to system information block type 1 transmitted at an interval of 20 ms.

9. A base station that supports a legacy system and an improved system having one or more functions added to the legacy system, the base station comprising:
   a transmitter configured to transmit a radio frame including a plurality of subframes; and
   a processor configured to:
   control the transmitter to transmit a first broadcast channel, containing system information for supporting a user equipment for the legacy system, in a predetermined number of symbols that follow a synchronization channel in a first subframe of the radio frame; and
   control the transmitter to transmit additional system information for supporting a user equipment for the improved system in a second subframe, other than the first subframe, from among the plurality of subframes,
   wherein: the additional system information is contained in a second broadcast channel that is different from the first broadcast channel and transmitted in the second subframe; and
   the processor is further configured to mask the second broadcast channel with a Cyclic Redundancy Check (CRC) that is different from a CRC applied to the first broadcast channel.

10. The base station according to claim 9, wherein a master information block in the first broadcast channel contains information that indicates presence of the second broadcast channel.

11. The base station according to claim 9, wherein: the plurality of subframes comprise ten subframes including subframe #0, which is a $0^{th}$ subframe, to subframe #9, which is a ninth subframe; the first subframe corresponds to subframe #0; and the second subframe corresponds to subframe #4, #5, or #9.

12. The base station according to claim 9, wherein the plurality of subframes comprise ten subframes including subframe #0, which is a $0^{th}$ subframe, to subframe #9, which is a ninth subframe;
   each of the ten subframes includes two slots;
   the first subframe corresponds to subframe #0;
   the second subframe corresponds to subframe #5; and
   the processor is further configured to control the transmitter to transmit the second broadcast channel in four leading symbols of a rear slot among the slots included in subframe #5.

13. The base station according to claim 9, wherein the processor is further configured to control the transmitter such that the additional system information is contained in a system information block.

14. The base station according to claim 13, wherein a master information block in the first broadcast channel contains information that indicates presence of the additional system information.

15. The base station according to claim 13, wherein:
   the plurality of subframes comprise ten subframes including subframe #0, which is a $0^{th}$ subframe, to subframe #9, which is a ninth subframe;
   the first subframe corresponds to subframe #0; and
   the second subframe corresponds to one of the ten subframes other than subframe #0.

16. The base station according to claim 13, wherein:
   the system information block corresponds to system information block type 1; and
   the processor is further configured to control the transmitter to transmit the system information block type 1 at an interval of 20 ms.

* * * * *